United States Patent
Thommana et al.

(10) Patent No.: US 12,289,697 B1
(45) Date of Patent: Apr. 29, 2025

(54) TACTICAL MULTI-RAT SIDELINK

(71) Applicant: Rockwell Collins, Inc., Cedar Rapids, IA (US)

(72) Inventors: John V. Thommana, Cedar Rapids, IA (US); Jeffrey D. Grundmeyer, Walker, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 439 days.

(21) Appl. No.: 17/962,104

(22) Filed: Oct. 7, 2022

(51) Int. Cl.
*H04W 56/00* (2009.01)
*H04W 72/1263* (2023.01)
*H04W 92/18* (2009.01)

(52) U.S. Cl.
CPC ..... *H04W 56/001* (2013.01); *H04W 72/1263* (2013.01); *H04W 92/18* (2013.01)

(58) Field of Classification Search
CPC ........... H04W 56/001; H04W 72/1263; H04W 92/18
See application file for complete search history.

(56) References Cited

U.S. PATENT DOCUMENTS

| | | | |
|---|---|---|---|
| 6,981,157 B2 | 12/2005 | Jakobsson et al. | |
| 7,817,706 B2 | 10/2010 | Karlsson | |
| 10,469,125 B2 | 11/2019 | Robertson et al. | |
| 10,812,955 B2 | 10/2020 | Agee | |
| 10,912,134 B2 | 2/2021 | Breuer et al. | |
| 10,998,927 B1 | 5/2021 | Chang et al. | |
| 11,101,909 B2 | 8/2021 | Chen et al. | |
| 2021/0168861 A1 | 6/2021 | Lee et al. | |
| 2021/0219248 A1* | 7/2021 | Wu | H04W 56/001 |
| 2021/0360549 A1* | 11/2021 | Lee | H04W 56/006 |

(Continued)

FOREIGN PATENT DOCUMENTS

| | | |
|---|---|---|
| AU | 2021101590 A4 | 5/2021 |
| CA | 2197332 A1 | 2/1996 |
| EP | 3827276 A1 | 6/2021 |

OTHER PUBLICATIONS

Garcia et al., "A Tutorial on 5G NR V2X Communications," in IEEE Communications Surveys & Tutorials, vol. 23, No. 3, pp. 1972-2026, third quarter 2021 (Year: 2021).*

(Continued)

*Primary Examiner* — Chae S Lee
(74) *Attorney, Agent, or Firm* — Suiter Swantz IP

(57) ABSTRACT

The US DoD is moving to incorporate 5G, particularly for sidelinks networks. 5G sidelink network are desired to operate at company, platoon, and squad levels independent of connection to 5G base stations (gNB). The 5G sidelink standards, as defined by 3GPP, cannot operate under active jamming at expected threat levels. The sidelink standards are defined for commercial use and cannot withstand active jamming. Various prior art uses beamforming, directionally beamformed MIMO, and even distributed MIMO as potential options to address active jamming. The SWAP-C and standards of the 5G UEs are not conducive to these anti-jamming techniques. A solution is described that uses the 5G sidelink physical layer with modifications at the control layer to avoid denial of the S-SSB. Intra-, inter-squad, and squad-to-command post communications may use the solution to avoid denial of the 5G sidelink.

20 Claims, 17 Drawing Sheets

(56) References Cited

U.S. PATENT DOCUMENTS

2022/0256366 A1     8/2022    Thommana et al.
2022/0256624 A1     8/2022    Thommana et al.

OTHER PUBLICATIONS

Ali, et al., "3GPP NR V2X Mode 2: Overview, Models and System-Level Evaluation," in IEEE Access, vol. 9, pp. 89554-89579, 2021, doi: 10.1109/ACCESS.2021.3090855.

Garcia et al., "A Tutorial on 5G NR V2X Communications," in IEEE Communications Surveys & Tutorials, vol. 23, No. 3, pp. 1972-2026, thirdquarter 2021, doi: 10.1109/COMST.2021.3057017.

Harounabadi, et al., "V2X in 3GPP Standardization: NR Sidelink in Release-16 and Beyond," in IEEE Communications Standards Magazine, vol. 5, No. 1, pp. 12-21, Mar. 2021, doi: 10.1109/MCOMSTD.001.2000070.

Lien et al., "3GPP NR Sidelink Transmissions Toward 5G V2X," in IEEE Access, vol. 8, pp. 35368-35382, 2020, doi: 10.1109/ACCESS.2020.2973706.

\* cited by examiner

900

902
COLLECT CONTROL DATA SENT OVER WAVEFORM

904
EXTRACT LOCATION AND LINK CONNECTIVITY STATUS OF NETWORK MEMBER(S)

906
DETERMINE LINK CONNECTIVITY BETWEEN NETWORK MEMBER(S)

908
DETERMINE SYNC REFERENCE UE

1002
COLLECT CONTROL DATA SENT OVER WAVEFORM

1004
EXTRACT LOCATION AND LINK CONNECTIVITY STATUS OF NETWORK MEMBER(S)

1006
PREDICT INTERFERENCE WITH ADJACENT NETWORK

1008
COMPUTE SIDELINK FREQUENCY REUSE

1010
DETERMINE NEW SIDELINK NETWORK CONFIGURATION

1012
DEPLOY NEW SIDELINK NETWORK CONFIGURATION

TACTICAL MULTI-RAT SIDELINK

TECHNICAL FIELD

The present invention generally relates to communication systems, and more specifically to denial resistant communication.

BACKGROUND

In 4G/LTE and 5G, a base station transmits a Synchronization Signal Block (SSB) to assist the UE in synchronizing with the bases station. The components of the SSB include the Primary Synchronization Signal (PSS), Secondary Synchronization Signal (SSS), and the Physical Broadcast Channel (PBCH). During cell search the UE uses the SSB to acquire time and frequency synchronization with a cell and determine its Physical Layer Cell ID (PCI) and other system information needed to operate.

The base station may be unavailable in some environments. 3GPP standards establish how the UE may fill the role of the base station. The UE may fill the role of the base station by configuring the UE as a sync reference UE. The sync reference UE may transmit the various information that the base station would normally transmit. For example, the sync reference UE may transmit the primary sync channel/signal, the secondary sync signal, and/or the broadcast channel. Other UEs may then receive the signals from the sync reference UE and form a sidelink network. 3GPP standards defines a number of modes in the 3GPP standards where the UE may become a sync reference UE. The UE may be assigned the roll as the sync reference UE from listening to the base station (base station will give configuration), by pre-configuration, and/or if the UE can't hear the current sync reference UE.

3GPP standards define the configuration of the UE during a pre-configuration step. The sync reference UE then transmits a sync reference signal in a fixed configuration. Other UEs may search for the sync reference signal from the sync reference UE in the fixed configuration. Undesirably, the fixed configuration may allow active jammers to deny the sync reference signal, thereby preventing formation and communication on the sidelink network. Therefore, it would be advantageous to provide a device, system, and method that cures the shortcomings described above.

SUMMARY

The S-SSB is made unpredictable in time and frequency to make the 5G sidelink less deniable. UEs in the network to receive a majority of the S-SSB transmitted so that the nodes can estimate the start of the frame and determine the carrier frequency offsets. S-SSB may be placed pseudo-randomly in frequency and time within the sidelink bandwidth forcing the adversary to substantially increases the size, weight, power, cost, complexity, and cooling power of their jammer. A waveform is employed in conjunction with the 5G sidelink. The waveform announces the upcoming S-SSB to prepare the UE to transmit and receive the pseudo-randomly spaced S-SSB. The waveform acts as an out-of-band control channel for the sidelink network for network management and resource management. The waveform may be communicated between SDRs. The SDRs provides one or more of the following: selection and reselection of a sync reference UE; a routing protocol with network split, network join, and network rejoin capabilities; and/or Inter-sidelink network routing. A distributed sidelink network manager may manage the sidelink networks at a company level, a platoon level, and/or a squad level.

BRIEF DESCRIPTION OF THE DRAWINGS

Implementations of the concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings:

FIG. 9A depicts a flow diagram of a method for determining a Sync Reference user equipment according to a routing protocol, in accordance with one or more embodiments of the present disclosure.

FIG. 10A depicts a flow diagram of a method for configuring sidelink networks to avoid interference, in accordance with one or more embodiments of the present disclosure.

DETAILED DESCRIPTION OF THE INVENTION

Figure 1:
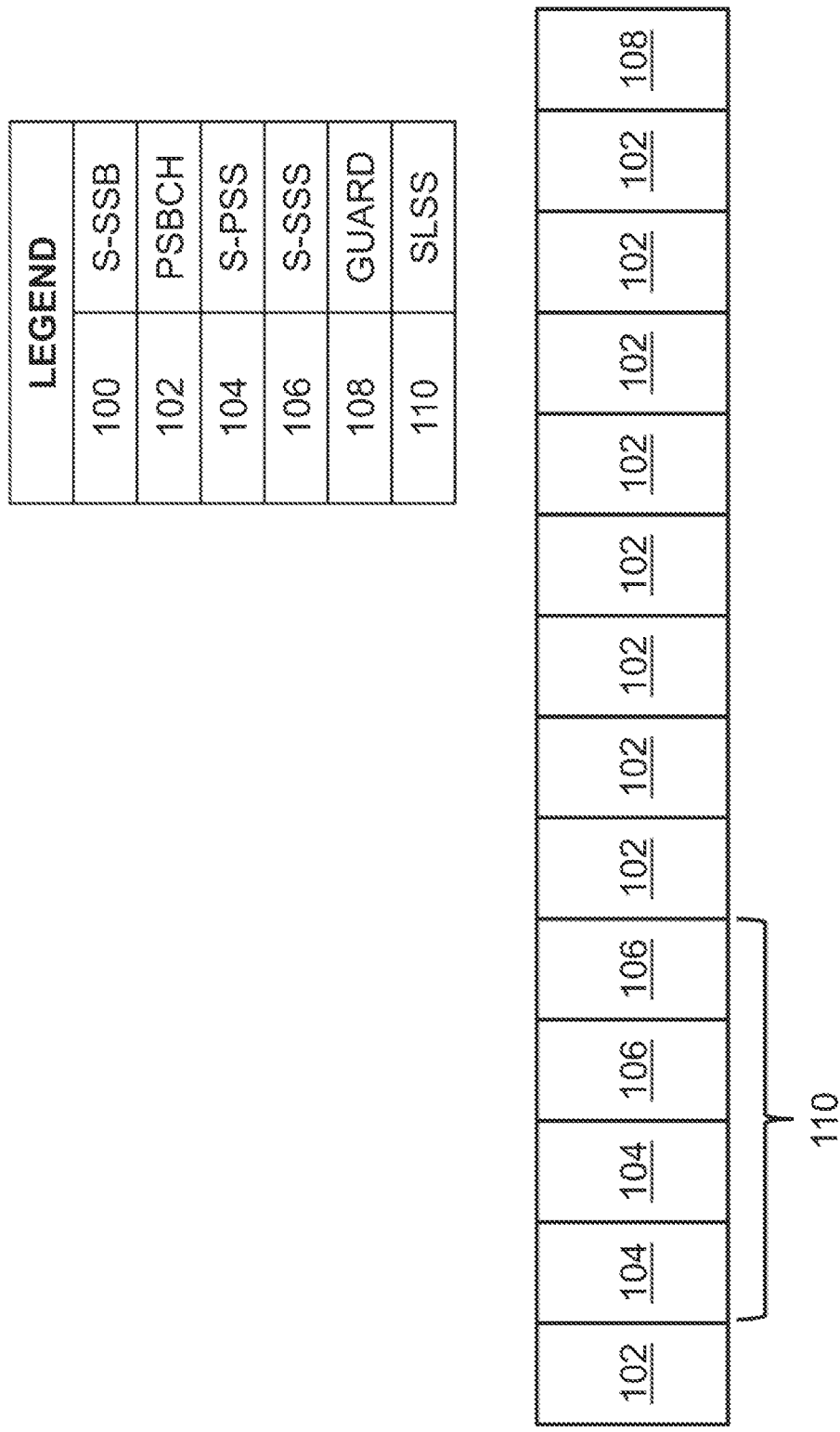
FIG. 1 depicts a Sidelink Synchronization Signal Block (S-SSB), in accordance with the prior art.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details are set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Referring generally now to one or more embodiments of the present disclosure. A method is described to obfuscate and remove the predictability of the sidelink control channels that can be easily exploited/denied by the enemy using low-cost pulse amplifier jammers. A software-defined radio is coupled with a 5G UE. The software-defined radio may use a waveform to make the sidelink control unpredictable. The unpredictability of the sidelink control may forcing the jammer to deny large chunks of the allocated sidelink spectrum nearly continuously, making jamming the sidelink untenable in practice.

U.S. Publication Number 2022/0256624, titled COMMUNICATION IN A DENIED ENVIRONMENT, filed on Feb. 9, 2021; and U.S. Publication Number 2022/0256366, titled Beyond-line-of-sight communication, filed on Apr. 19, 2021; are incorporated herein by reference in the entirety.

A number of terms are now described.

Third generation partnership project (3GPP). 3GPP defines the standards for cellular telecommunications including 4G/LTE, 5G, and future 6G.

(5G). 5G may refer to $5^{th}$ generation cellular.

Army Navy/Portable Radio Communication (AN/PRC).

Binary Phase-shift keying (BPSK).

Common Data Link (CDL). CDL may include one or more types, such as, but not limited to, Bandwidth Efficient CDL (BE-CDL), Discovery CDL (D-CDL), and the like.

Control plane. Control plane may carry routing traffic.

Department of Defense (DoD). DoD may set forth a DoD Communications Waveform Inventory. The DoD Communications Waveform Inventory may include a number of waveforms, such as, but not limited to, D-CDL, SATURN, TSM, WREN-TSM, and the like.

Frame. Frame may include a number of subframes, such as 10 subframes in a 10-millisecond period.

Frequency Range (FR). FR is a band of frequencies for V2X. FR may include 5G frequency range 1 (FR1) and/or frequency range 2 (FR2).

Guard. Guard may refer to a reserved guard period symbol.

Internet Protocol (IP). IP may refer to a network layer in a communications protocol.

Link layer. Link layer may refer to a wired media access channel layer, such as a link layer a UE and a software-defined radio or a link layer between software-defined radios.

Mobile ad hoc network (MANET).

Medium Access Control (MAC). MAC may refer to the channel access layer that controls access to the PHY.

Orthogonal frequency-division multiplexing (OFDM).

Out-of-band. Out-of-band may refer to transferring data in a channel outside of a main channel, such as transmitting data in a secure waveform outside of a cellular waveform.

PC5. Interface used by a UE for direct communication with another UE.

Packet Data Convergence Protocol (PDCP). PDCP is a layer of the 5G protocol stack. PDCP is above RLC and below RRC in the control plane. PDCP is above RLC and below SDAP in the user plane.

Plane. Plane may refer to a type of data or traffic carried over a communications network.

Physical Sidelink Broadcast Channel (PSBCH). PSBCH may carry information for accessing information needed to communicate via sidelink. PSBCH sent as part of S-SSB.

Physical Layer (PHY). PHY may refer to the modulation and demodulation of information over a physical medium. PHY may include a USB interface (USB-PHY). PHY may include a 5G new radio air interface (5G NR-PHY) or a similar 4G/LTE/future 6G interface. PHY may include a secure non-3GPP waveform (Mesh-PHY).

Radio Access Technology (RAT). RAT may refer to a wireless communication capability other than 3GPP cellular.

Radio Link Control (RLC). RLC is a layer of the 5G protocol stack. RLC may be above the MAC and below the PDCP in both the control plane and the user plane.

Radio Resource Control (RRC). RRC is a layer of the 5G protocol stack. RRC is above PDCP and below NAS in the control plane.

Resource block. Resource block may include 12 subcarriers in the frequency domain for 5G.

Receiver UE (Rx UE). Rx UE refers to a UE which receives a SSB from a sync reference UE and/or transmission from a Tx UE.

Second Generation Anti-jam tactical UHF radio for NATO (SATURN).

Service Data Adaption Protocol (SDAP). SDAP is a layer in the 5G protocol stack. SDAP may be above the PDCP layer in the user plane.

Software-defined radio (SDR). SDR may include functionality defined by software. SDR may include signal processing functionality defined in software, for generating a waveform as sampled digital signals, converting from digital to analog via high-speed Digital-to-Analog Converter (DAC), and then translating to Radio Frequency (RF) for wireless propagation to a receiver.

Sidelink. Sidelink may refer to communications between devices, such as between UEs. Sidelinks may connect UEs by a cellular waveform without a base station. Sidelink is described in 3GPP Release 12 and onwards. Sidelink may also be referred to as V2X. Sidelinks may also be referred to as 5G sidelink when connecting 5G UEs. Sidelinks may be used for short range ground-ground and air-ground communication. Sidelinks may be desirable for achieving relatively high throughput communications at close ranges.

Sidelink Synchronization Signal (SLSS). SLSS sent as part of S-SSB. SLSS includes S-SSB and S-SSS. SLSS used for time and frequency synchronization of receiver UEs to sync reference UE. SLSS used by receiver UE to estimate beginning of frame and carrier frequency offsets.

Sidelink Primary Synchronization Channel (S-PSS). S-PSS may be used by receiver UE to synchronize to sync reference UE. S-PSS sent as part of SLSS. S-PSS generated by M-Sequence.

Sidelink Synchronization Signal Block (S-SSB). S-SSB includes PSBCH and SLSS (e.g., S-PSS and S-SSS). S-SSB includes a determinable frequency location according to 3GPP standards. S-SSB may undesirably be denied by active jamming of the preconfigured frequency location. S-SSB may be transmitted with a period of 160 milliseconds with one or more repeats in the period.

Sidelink Secondary Synchronization Channel (S-SSS). S-SSS may be used by receiver UE to synchronize to sync reference UE. S-SSS sent as part of SLSS. S-SSS generated by Gold-sequence.

Slot. Slot includes a number of OFDM symbols per slot, such as 14 symbols per slot. Slot includes a length based on subcarrier spacing.

Subcarrier. Subcarrier is a carrier wave modulated by a signal wave to carry information.

Subcarrier spacing (SCS). SCS may include a range of spacing for 5G, such as, but not limited to, 15, 30, 60, 120, and 240 KHz.

Subframe. Subframe may include one or more slots based on the subcarrier spacing, such as one slot per subframe at a subcarrier spacing of 15 kHz, two slots per subframe at a subcarrier spacing of 30 kHz, and so on.

Symbol. Symbol may be used to encode bits of data.

Synchronization reference UE (Sync reference UE). Sync reference UE may be a UE which transmits S-SSB to Rx UEs.

Time division duplexing (TDD).

Transmission Security (TRANSEC). TRANSEC may use pseudo-random transmission security keys that are manipulated by cryptographic algorithms to ensure that transmission bursts have a low probability of being detected, intercepted, and exploited.

Tactical Scalable MANET (TSM). TSM is secure communication protocol in the DoD waveform inventory. TSM may include one or more types, such as, but not limited to, Warrior Robust Enhanced Network TSM (WREN TSM).

Transmitter UE (Tx UE). Tx UE refers to a UE which transmits information in a sidelink network. Tx UE transmits the information with a start of frame and a carrier frequency offset according to the S-SSB from the sync reference UE.

Universal Serial Bus (USB).

User plane. User plane may also be referred to as a data plane. User plane may carry network user traffic.

User equipment (UE). The UE may include a 3GPP compliant device. The UE also be referred to as a 5G mobile device, or a 5G UE. The UE may be equipped with a 5G Radio Access Network (RAN) interface. The UE may utilize a cellular waveform to establish a sidelink with UEs within the range of the cellular waveform. The UE may transmit and/or receive signals over the 5G sidelink. The UE may include any suitable user device for communicating wirelessly over a 5G sidelink, such as, but not limited to, a cellular phone or any device equipped for a cellular network connection.

Vehicle-to-Everything (V2X). V2X defines the following use cases: V2V (Vehicle-to-Vehicle) to enable cooperative automated driving, V2P (Vehicle-to-Pedestrian) to safeguard pedestrian safety, V2I (Vehicle-to-Infrastructure) to enable communication with road side units (RSU) for local road and traffic information dissemination to vehicles, V2N (Vehicle-to-Network) to enable commercial services by providing access to cloud stored data.

Waveform (WF) may refer to a wireless physical layer transmission and reception over a radio wave. The waveform may refer to a set of characteristics, for example, frequency bands, modulation techniques, message standards, and transmission systems. The Waveform may be an anti-jam, LPD, LPI waveform, such as a waveform selected from the DoD Communications Waveform Inventory.

Warrior Robust Enhanced Network (WREN).

Referring now to FIG. 1, Sidelink Synchronization Signal Block (S-SSB) 100 is described. The S-SSB 100 may be used for estimating the beginning of the frame and carrier frequency offsets. The S-SSB 100 includes Primary Sidelink Broadcast Channel (PSBCH) 102 and sidelink synchronization signal (SLSS) 110. The SLSS 110 includes Sidelink Primary Synchronization Channel (S-PSS) 104 and Sidelink Secondary Synchronization Channel (S-SSS) 106. S-PSS 104 and S-SSS 106 are periodically broadcast as part of the S-SSB 100 so that a UE can estimate the beginning of the frame and carrier frequency offsets. The S-SSB 100 provides where the frame is, whether the frequency has drifted, and the like. The S-SSB 100 may also indicate the control channel information of what is sent in the PSBCH 102. The S-PSS 104 and the S-SSS 106 are very robust signals. The S-PSS 104 is a 127-bit m-sequence. The S-SSS 106 is a 127-bit gold sequence. Both the S-PSS 104 and the S-SSS 106 are BPSK modulated. The S-PSS 104 and S-SSS 106 can be reliably received at low signal to noise ratio. The S-SSB 100 occupies one time slot and the PSBCH, S-PSS and S-SSS are located in the first eleven (11) or thirteen (13) symbols of the S-SSB 100. The S-SSB 100 may include a duty cycle of 0.625%. In embodiments, the PSBCH 102, the guard 108, the SLSS 110 may include a given number of subcarriers. For example, the PSBCH 102 and the guard 108 may include, but are not limited to, 132 subcarriers. By way of another example, the SLSS 110 (e.g., the S-PSS 104 and the S-SSS 106) may include, but is not limited to, 127 subcarriers.

Figure 2:
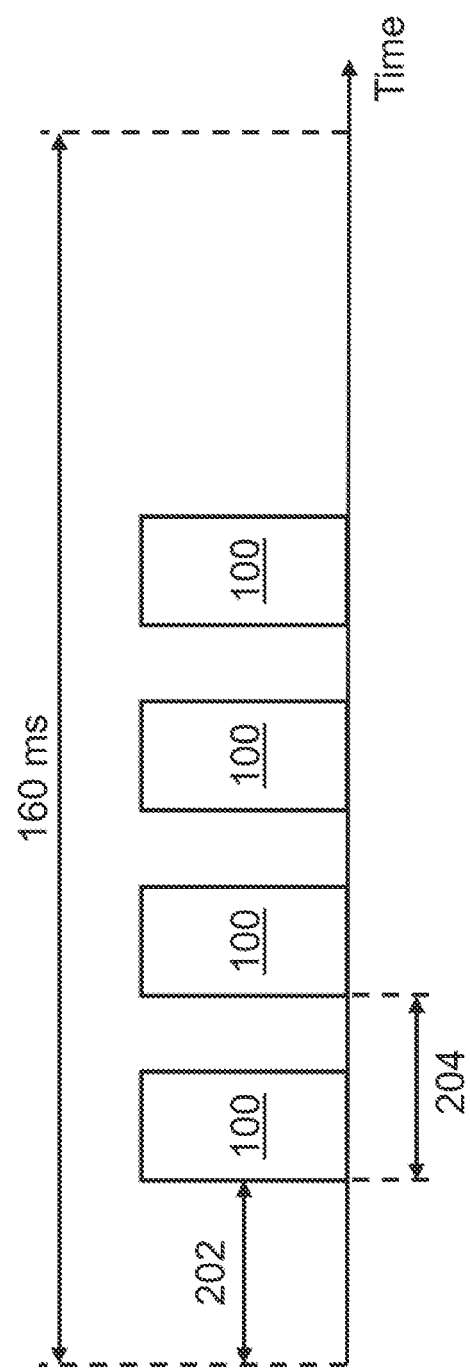
FIG. 2 depicts a Sidelink Synchronization Signal Block (S-SSB) period with multiple (S-SSB) signals, in accordance with the prior art.

Referring now to FIG. 2, an S-SSB period 200 is described. The S-SSB period 200 has a periodicity of n-frames (160 milliseconds). For example, the S-SSB period 200 may include a periodicity of 16 frames every 160 milliseconds. During the S-SSB period 200, the S-SSB 100 may be repeated multiple times. UEs may receive one or more of the S-SSBs 100 during the S-SSB period 200. In FR1, the S-SSB 100 may be repeated up to 1, 2, or 4 times corresponding to subcarrier spacing of 15, 30, and 60 KHz. In FR2, the repeat factor can be as high as 64 times, although this is not intended to be limiting. Exemplary repeat factors are provided in the following table:

TABLE 1

| Frequency Range | Subcarrier Spacing (SCS) | Number of S-SSBs per period |
| --- | --- | --- |
| FR1 | 15 kHz | 1 |
|  | 30 kHz | 1, 2 |
|  | 60 kHz | 1, 2, 4 |
| FR2 | 60 kHz | 1, 2, 4, 8, 16, 32 |
|  | 120 kHz | 1, 2, 4, 8, 16, 32, 64 |

Figures 3A, 3B:
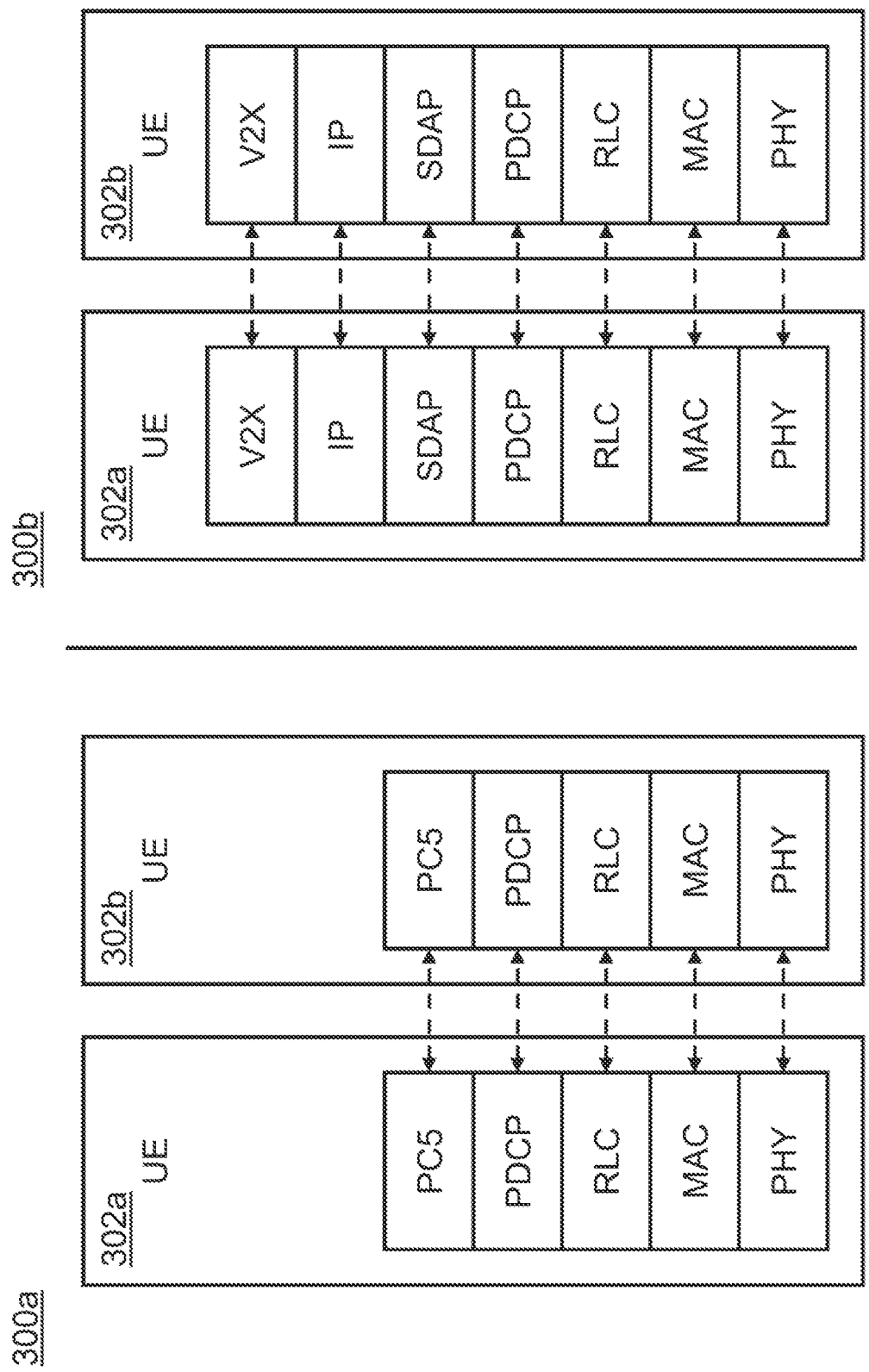
FIG. 3A depicts a protocol stack for a control plane in a sidelink network between user equipment (UE), in accordance with the prior art.
FIG. 3B depicts a protocol stack for a user plane in a sidelink network between user equipment, in accordance with the prior art.

Referring now to FIGS. 3A-3B, protocol stacks 300 are described. The protocol stacks 300 may be used for forming a sidelink network between UEs 302. For example, the protocol stacks 300 depict communication between a UE 302a and a UE 302b. The UE 302a and the UE 302b are not intended to be limiting as a number of the UEs 302 may communicate by the protocol stacks 300. As depicted in FIG. 3A, the 5G protocol stack may include a protocol stack 300a for a control plane. The protocol stack 300a may include the control plane for sidelink communication between UEs, in accordance with 3GPP standards. The protocol stack 300a may include one or more layers, such as, but not limited to, PC5, PDCP, RLC, MAC, and/or PHY. As depicted in FIG. 3B, the 5G protocol stack may include a protocol stack 300b for a user plane. The protocol stack 300b may include the user plane for sidelink communication between UEs, in accordance with 3GPP standards. The protocol stack 300b may include one or more layers, such as, but not limited to, V2X, IP, non-IP, SDAP, PDCP, RLC, MAC, and/or PHY.

Details of the protocol stacks 300 may be implemented for 4G/LTE and/or future 6G with appropriate modifications. Such modifications are not material for the purposes of the present disclosure.

5G may utilize a variety of bands. For example, V2X can be operated in 5G frequency range 1 (FR1) and/or frequency range 2 (FR2). FR1 may include a frequency range from 410 through 7,125 MHz. FR2 may include a frequency range from 24,250 through 52,600 MHz. FR1 may include the following bands n14 (788-798 MHz), n38 (2570-2620 MHZ), n79 (4400-5000 MHZ), and n47 (5855-5925 MHz). V2X is operated in time division duplexing (TDD) mode with 10, 20, 30, and 40 MHz channel bandwidths. The point to be noted here is that n14, n38, n79 are licensed bands and resource allocation for operating sidelinks in this band is under the control of a base station (e.g., a gNB), hence not usable for sidelink operations when not in in-coverage mode. Although much of the present disclosure is directed to FR1, this is not intended as a limitation of the present disclosure. The principles regarding FR1 may also apply to FR2. FR2 may be used to achieve sidelink networks with higher bandwidths at an expense of a shorter range of signals between UEs in the network (e.g., shorter sidelink range). The shorter side link range may force the jammer to come closer. One difference between FR1 and FR2 is that the sidelink synchronization signal may be repeated more in FR2 as compared to FR1, although this is not intended to be limiting. The sidelink synchronization signal may be repeated because of the beam widths associated with FR2.

In embodiments, the UE 302 is EIRP limited to +23 dBm (200 milliwatts), although this is not intended to be limiting. The UE 302 may include an operating range, within which UEs 302 may receive the S-SSB 100. For example, the UEs 302 may include an operating range of up to 200 meters, although this is not intended to be limiting.

Figure 4:
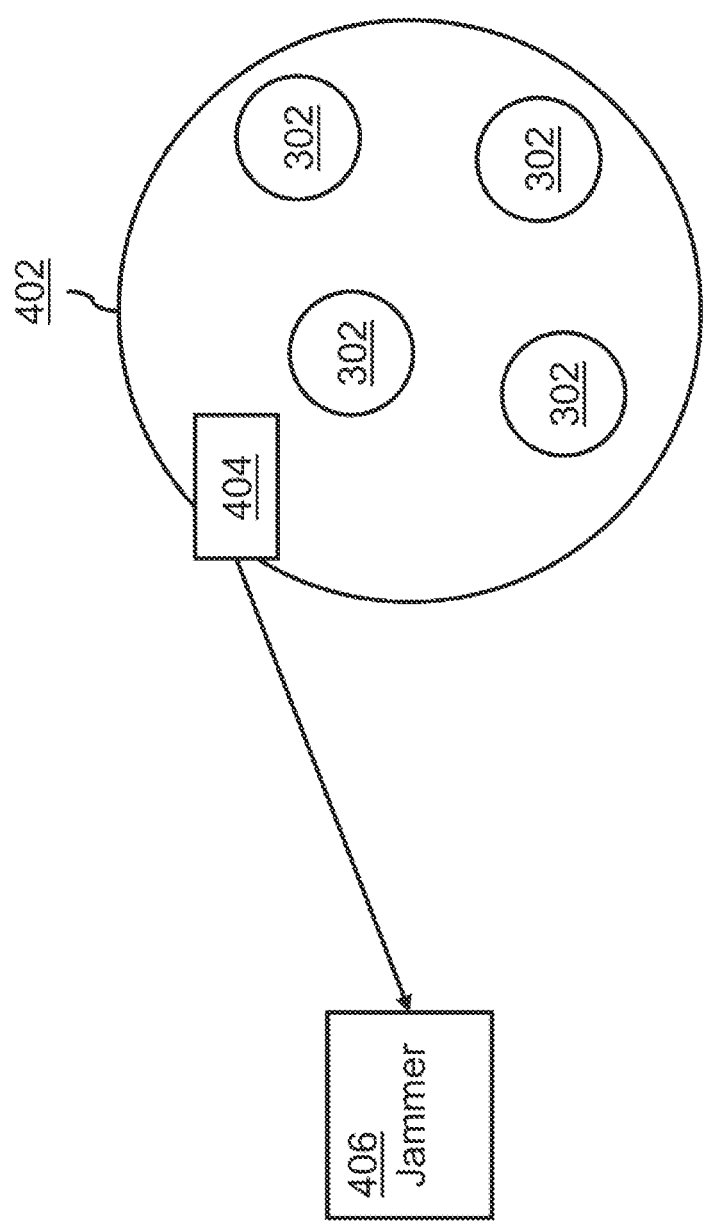
FIG. 4 depicts an environment including a sidelink network subject to active jamming, in accordance with one or more embodiments of the present disclosure.

Referring now to FIG. 4, a simplified diagram of an environment 400 is described, in accordance with one or more embodiments of the present disclosure. The environment 400 may include one or more sidelink networks 402. The sidelink network 402 may also be referred to as a 5G sidelink. The sidelink networks 402 may include multiple of the UEs 302 which communicate by 3GPP standards (e.g., by the protocol stacks 300).

The sidelink protocol supported by 3GPP standards has made the S-SSB 100 predictable. For example, the 3GPP standards may cause the UE to send the S-SSB 100 at a specific place and at a specific time. The predictability of the S-SSB 100 may reduce the search space of the UEs 302. The UEs 302 may be allowed to find and synchronize to the sidelink network 402 due to the reduced search space. The predictability of the S-SSB 100 may also reduce the power consumption to improve battery life of the UEs 302. However, this predictability also makes the S-SSB 100 highly detectable and exploitable.

Undesirably, the environment 400 may include an interceptor 404 and/or a jammer 406. The sidelink network 402 does not preclude the presence of the interceptors 404 or jammers 406 in close proximity. It is contemplated that the 406 jammer is unlikely to jam sidelink user traffic. The jammer 406 may be unlikely to jam the sidelink user traffic due to a need to employ a near continuous jamming signal. Instead, the jammer 406 may jam the S-SSB 100 to prevent synchronization. The simplest and most efficient sidelink denial technique of S-SSB 100 is denying the reception of the SLSS 110 during the transmission of the S-SSB 100.

The interceptor 404 and/or jammer 406 may determine what frequencies or what subcarriers are used for the sync reference signals and/or which frequencies are used for transmitting the S-SSB and when the sync reference will be transmitted. The jammers 406 may be configured to jam or disrupt the 5G sidelink communications based on the S-SSB 100. In particular, the jammers 406 may disrupt the SLSS 110 of the S-SSB 100 used by the sidelink network 402. At the same time as the SLSS 110, the jammer 406 may send a high-power signal. The high-power signal may cause the UEs 302 to be unable detect the SLSS 110. The UEs 302 are then unable to join and form the sidelink network 402 because the UEs 302 don't detect the SLSS 110. The S-SSB 100 occupies one time slot and the PSBCH 102, S-PSS 104, and S-SSS 106 are located in the first eleven (11) or thirteen (13) symbols of an S-SSB slot. Thus, the jammer 406 has to be active for only 13 symbols whenever the S-SSB 100 is transmitted preventing the UE's 302 from joining the sidelink network 402.

Disrupting the SLSS 110 may entirely disrupt the sidelink network 402 while requiring minimal jamming power. The duty cycle of the SSB 100 is relatively small. Undesirably, pulse power amplifiers may be used to deny the SSB 100 because of the low duty cycle. The power amplifiers may go very high power for a very short time (e.g., 1 percent of the time) and then don't do anything for the remaining time. The power amplifiers may then repeat the pulses to deny the SSB 100. For example, the jammers 406 may actually deny the sidelink network 402 that is operating in any bands from 600 MHz to 5.9 GHZ.

In embodiments, a squad of soldiers may be deployed in a cell. The cell may include a radius defined by one or more operational parameters of the mission. Each soldier may include the UE 302. The UEs 302 may be separated from each other between a maximum and minimum value based on the position of the solder in the cell. The UEs 302 may be communicatively coupled in by the sidelink network 402. One or more of the interceptors 404 and/or the jammers 406 may be disposed within the cell or within a given radius outside of the cell. For example, the interceptor 404 may be disposed within the cell and receive sync reference signals from the UEs 302 of the soldiers. The interceptor 404 may communicate the sync reference signal to the jammer 406 located at a given standoff distance from the cell. The jammer 406 may jam the sync reference signal, preventing the UEs from communicating over the sidelink network. As depicted, the sidelink network 402 may be denied by the jammer 406 outside of a cell radius of the sidelink network 402, although this is not intended as a limitation of the present disclosure.

It is contemplated that an airborne jammer (e.g., a low altitude drone) with a relatively low effective isotropic radiated power (EIRP) may deny the sidelink network 402. For example, the jammer may utilize a low duty cycle pulse amplifier which may be sufficient to deny the 5G sidelink.

5G Sidelink communications according to 3GPP standards are detectable and deniable. Losing the sidelink networks when the UEs 302 are deployed in an adversarial environment is an undesirable result. Therefore, it would be desirable to obfuscate the S-SSB to withstand active jamming.

Referring generally to FIGS. 5 through 11B. Embodiments of the present disclosure are directed to utilizing a 5G sidelink in the presence of jammers. Embodiments of the present disclosure are directed to making the S-SSB 100 unpredictable to the interceptor 404 and/or the jammer 406. The S-SSB 100 may be unpredictable without significantly increasing the search space and battery consumption of the UEs 302. The S-SSB 100 may be made unpredictable by changing the time/frequency allocation of the transmission of the S-SSB 100. An out-of-band tactical control channel (e.g., a tactical anti-jam order wire) may be used to transmit the time/frequency allocation of the transmission of the S-SSB 100. The out-of-band tactical control channel may be transmitted between software-defined radios physically coupled to the UEs in the sidelink network. The UEs may receive the time/frequency allocation of the transmission S-SSB from the software-defined radios. The UEs may then know where to transmit the S-SSB 100 and/or where to search for the transmission of the S-SSB 100. Thus, the S-SSB 100 is predictable to the UEs but unpredictable to the jammer or eavesdropper.

Figure 5:
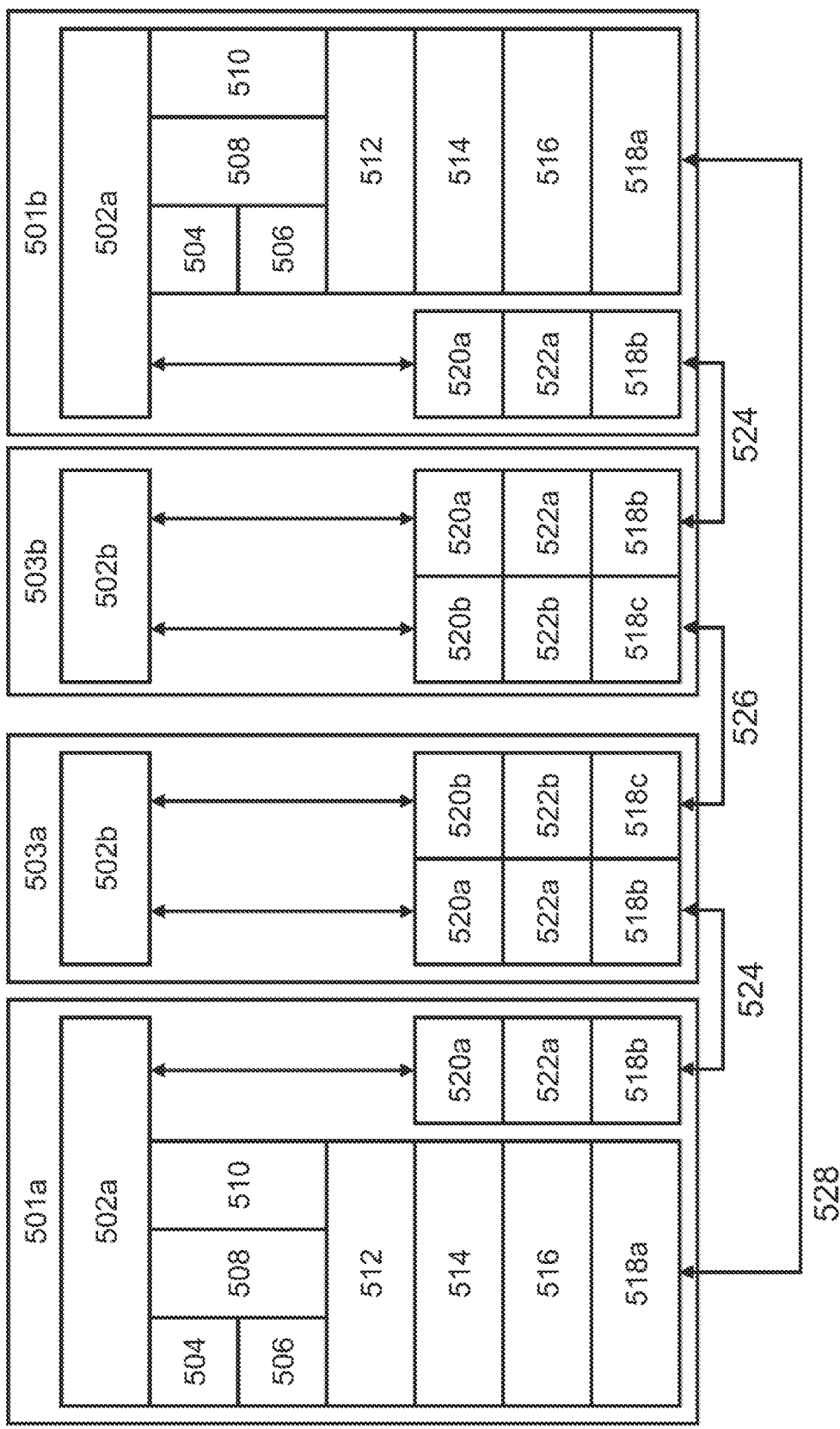
FIG. 5 depicts a protocol stack of a system including user equipment and software-defined radios, in accordance with one or more embodiments of the present disclosure.

Referring now to FIG. 5, a protocol stack of a system 500 is described, in accordance with one or more embodiments of the present disclosure. The system 500 may include one or more UEs 501 (e.g., 5G UE) and one or more software-defined radios 503. The software-defined radios 503 may configure the synchronization schedule for the S-SSB 100 used by the UEs 501. The UEs 501 may then follow the synchronization schedule when transmitting and/or receiving the S-SSB 100. Thus, the system 500 may allow the UEs 501 to have an increased likelihood of formation of 5G sidelink networks (e.g., sidelink network 402). The 5G sidelink network may then be used to transmit data between the UES by a sidelink 528, which may be desirable to achieve a relatively high data bandwidth. The system 500 may allow the UEs 501 to securely communicate over a sidelink network, even when subject to frequency jamming in a contested environment. The ability to securely communicate over the sidelink network gives the Department of Defense (DoD) the flexibility to deploy 5G mobile devices into the contested environments. It is contemplated that the system 500 may be particularly advantageous for soldiers. For example, each soldier may carry the UE 501 and the software-defined radio 503.

The software-defined radio 503 may include any number of software-defined radio (SDR) capable of hosting the waveform. The software-defined radio 503 may also be referred to as tactical radios. As may be understood, SDRs may include a number of components, permutations, and arrangements, which are not set forth herein for clarity. The SDRs may also include memory and processors by which to implement any of the functions described herein, such as, but not limited to, proxying messages to reduce overhead. The SDRs may also be a multi-channel radio. The multi-channel radio may then use whichever secure non-3GPP waveform is most appropriate for its operational environment. For example, the radio may select the secure non-3GPP waveform to improve resilience, throughput, latency, and the like. In embodiments, the software-defined radio 503 may include a handheld radio, manpack radio, airborne radio, vehicle radio, and the like. For example, SDRs may include, but are not limited to, an army navy AN/ARC-210 radio or an AN/PRC 162 radio.

In embodiments, the software-defined radio 503 may be configured to determine a broadcast schedule for the S-SSB 100. The broadcast schedule may also be referred to as a network configuration or a sidelink configuration. The broadcast schedule may include parameters needed to predict the location of the S-SSB 100. For example, the broadcast schedule may indicate the time and frequency allocation of subcarriers used to transmit the S-SSB 100. The broadcast schedule may cause a location of the subcarriers of the S-SSB 100 to hop for avoiding active jamming.

The broadcast schedule may indicate the location of the subcarriers for the S-SSB. The UEs may transmit and receive the S-SSB over multiple subcarriers or multiple places in the spectrum. The S-SSB 100 occupies 132 subcarriers. The S-SSB may be frequency-hopped in transmission. The frequency-hopped transmission may make the S-SSB more difficult to jam. If 50 Resource Blocks (600 sub carriers) occupying 9 MHz of a 10 MHz sidelink spectrum is allocated to the S-SSB 100, then the S-SSB 100 may be placed in $^{132}C_{600}$ possible locations. An interceptor or jammer listening searching for the S-SSB 100 cannot predict where the next S-SSB 100 will occur but can only detect it after the occurrence. Instead, the number of locations may force the jammer to jam more than 7 MHz of the spectrum for large periods of time (due to repetition factor and multiple Sync Reference UEs in the network). The first 5 symbols of the S-SSB 100 have to be jammed to deny reception of the S-SSB 100. In one instantiation, the S-SSB 100 occupies 132 contiguous subcarriers. In another instantiation, the S-SSB 100 may start at any subcarrier instead of being clustered around the center. The jammer now has to become a partial band jammer to be able to deny the S-SSB. This prevents the jammer from being able to use a low duty cycle pulse power jammer to deny the S-SSB 100. Instead, the jammer must utilize a higher power, continuous power amplifier while also accounting for the size, weight, power, processing resources, cost, thermal, battery size of the airborne drone. It cannot be guaranteed that the jammer will not deny the S-SSB occasionally. However, it is contemplated that the jammer may only disrupt the S-SSB signal occasionally. Although the S-SSB is described as occupy contiguous subcarriers, this is not intended as a limitation of the present disclosure. In embodiments, the S-SSB 100 may occupy dis-contiguous subcarriers. The S-SSB 100 may be spread out in pseudo-random manner amongst the subcarriers. Spreading the S-SSB 100 in dis-contiguous subcarriers may make it more difficult for the jammer to deny the S-SSB 100. The jammer must deny more of the bandwidth allocated to the sidelink, as the jammer has to predict where the SLSS is located.

The software-defined radio 503 may determine the broadcast schedule according to a pseudorandom sequence. The pseudorandom sequence may be known to the software-defined radios 503. For example, the software-defined radios 503 may include an algorithm to determine the pseudorandom sequence. The software-defined radios 503 may determine the broadcast schedule pseudo-randomly by a transmission security key and algorithm. A transmission security (TRANSEC) key may be used with the algorithm to determine the broadcast schedule. The TRANSEC key may be communicated from the radio coupled to the sync reference UE to a radio coupled to a receiver UE. In embodiments, transmitting the broadcast schedule between the SDRs may include transmitting the TRANSEC key over the waveform 526.

The system 500 may include a waveform 526 between the software-defined radios 503. The software-defined radio 503 may be configured to communicate with other SDRs over the waveform 526. The waveform 526 may be used to transmit information between the radios 503. For example, the software-defined radios 503 may transmit the broadcast schedules for the S-SSB 100 by the waveform 526. The broadcast schedule is transmitted over the waveform 526 to prevent denial, due to the anti-jam, LPD, LPI characteristics of the waveform 526. The waveform may also be used to allocate and deallocate resources so that the enemy cannot selectively jam small portions of the network at specific times to deny sidelink operations. Persistent resources for unicast, multicast, and relay services may also be requested over the waveform 526.

The waveform 526 may also be referred to as a tactical waveform, a secure waveform, anti-jam waveform, an order wire, and the like. The waveform 526 may include any protocol which is resistant to physical layer denial. Many such waveforms which are resistant to physical layer denial are available to the Department of Defense (DoD). For example, the waveform 526 may include any waveform protocols selected from the DoD Communications Waveform Inventory (2022), such as, but not limited to, CDL (e.g., D-CDL), TSM, WREN-TSM, SATURN, and the like. Although the secure non-3GPP waveform is described in the context of the DoD inventory, this is not intended as a limitation of the present disclosure. The waveform 526 between the SDRs 503 may be considered a low probability of interception and/or a low probability of detection (LPI/LPD) waveform. Additionally, the waveform 526 between the SDRs 503 may be considered a wide-area wireless communication network. Wide-area wireless communication network may refer to wireless communication at a range of several kilometers or more within line-of-sight of the software-defined radio.

The software-defined radio 503 may implement any one or more of the following for communicating by the waveform 526: Frequency Modulation (FM), Amplitude Modulation (AM), Single Side Band (SSB), Double Side Band (DSB), Vestigial Sideband (VSB), Frequency Shift Keying (FSK), Phase Shift Keying (PSK), Gaussian Minimum Shift Keying (GMSK), Quadrature Amplitude Modulation (QAM), Frequency Hopped Spread Spectrum (FHSS), Direct Sequence Spread Spectrum (DSSS), Orthogonal Frequency Division Multiplexing (OFDM) and the like.

Each of the UEs 501 may be paired with the software-defined radios 503 by a physical connection 524. The physical connection 524 may be used to transmit information between the UEs 501 and the software-defined radios 503. For example, the software-defined radios 503 may transmit the broadcast schedules for the S-SSB 100 to the UEs 501 by the physical connection 524. The UEs 501 and the SDRs 503 may be physically connected by any suitable wired connector, such as, but not limited, to ethernet, USB (e.g., USB-C), a lightning bus, or another cable. Appropriate modification may be made to the various protocol stacks to accommodate the connectors. It is understood that some form of physical layer conversion may be needed in the case of some tactical radios which may not have USB interfaces.

The UEs 501 may be configured to communicate by a sidelink 528. The sidelink 528 may include sidelink user traffic and/or one various control signaling. The sidelink 528 between the UEs 501 may be advantageous for achieving information throughput for close range communications using relatively low powers. Low powers may be considered between 100 milliwatts to 1 watt in transmit. For example, the UE 501 may achieve 10 megabits per second or more at a range of up to 200 meters when transmitting at full power. The waveform 526 between the software-defined radios 503 may or may not be unable to achieve throughput at the low power.

In embodiments, the UE 501 and/or the software-defined radio may host one or more protocol stacks, as will be described further herein.

In embodiments, the UE 501 may host one or more protocol stacks for communication over the sidelink 528. The protocol stacks for communication over the sidelink 528 may include various control plane and/or data plane layers. For example, the protocol stacks for communication over the sidelink 528 may include one or more of the following IP 504, SDAP 506, RRC 508, PC5 510, PDCP 512, RLC 514, MAC 516, and/or 5G PHY 518*a*.

In embodiments, the UE 501 and/or the software-defined radio may host protocol stacks for communication over the physical connection 524. The protocol stacks for communication over the physical connection 524 may include various control plane and/or data plane layers. For example, the protocol stacks for communication over the physical connection 524 may include one or more of the following: PHY 518*b*, Protocol layer 520*a*, and/or link layer 522*a*. As may be understood, the terms PHY 518*b*, Protocol layer 520*a*, and/or link layer 522*a* may correspond to the specific physical connect used between the UE 501 and the software-defined radio. For example, the physical connection 524 may include USB, such that the PHY 518*b* may be a USB PHY, the protocol layer 520*a* may be a USB protocol layer, and the link layer 522*a* may be a USB link layer. Similarly, the PHY 518*b*, Protocol layer 520*a*, and/or link layer 522*a* may be modified where the physical connection 524 is another type of physical connection.

In embodiments, the software-defined radios 503 may host one or more protocol stacks for communication over the waveform 526. The protocol stacks for communication over the waveform 526 may include various control plane and/or data plane layers. For example, the protocol stacks for communication over the waveform 526 may include one or more of the following PHY 518c, Protocol layer 520b, and/or link layer 522b. As may be understood, the terms PHY 518c, Protocol layer 520b, and/or link layer 522b may correspond to the waveform 526 used between the software-defined radios 503. For example, the waveform 526 may include a mesh waveform, such that the PHY 518c may be a mesh PHY, the protocol layer 520b may be a mesh protocol layer, and the link layer 522b may be a mesh link layer. Similarly, the PHY 518c, Protocol layer 520b, and/or link layer 522b may be modified where the waveform 526 is another type of waveform.

In embodiments, the UE 501 and/or the software-defined radios 503 may host an application layer 502. The application layer 502 may implement one or more methods for the UE 501, as will be described further herein. For example, the application layer 502 may coordinate pairing between the UE 501 and the software-defined radios 503, the schedule of the S-SSB 100, and the like. The application layer 502 may also be referred to as a tactical sidelink application or a software application. In embodiments, the UE 501 includes an application layer 502a. The application layer 502a may be provided above the protocol stacks for communication over the sidelink 528 and above the protocol stacks for communication over the physical connection 524. In embodiments, the software-defined radio includes an application layer 502b. The application layer 502b may be provided above the protocol stacks for communication over the waveform 526 and above the protocol stacks for communication over the physical connection 524.

Figure 6:
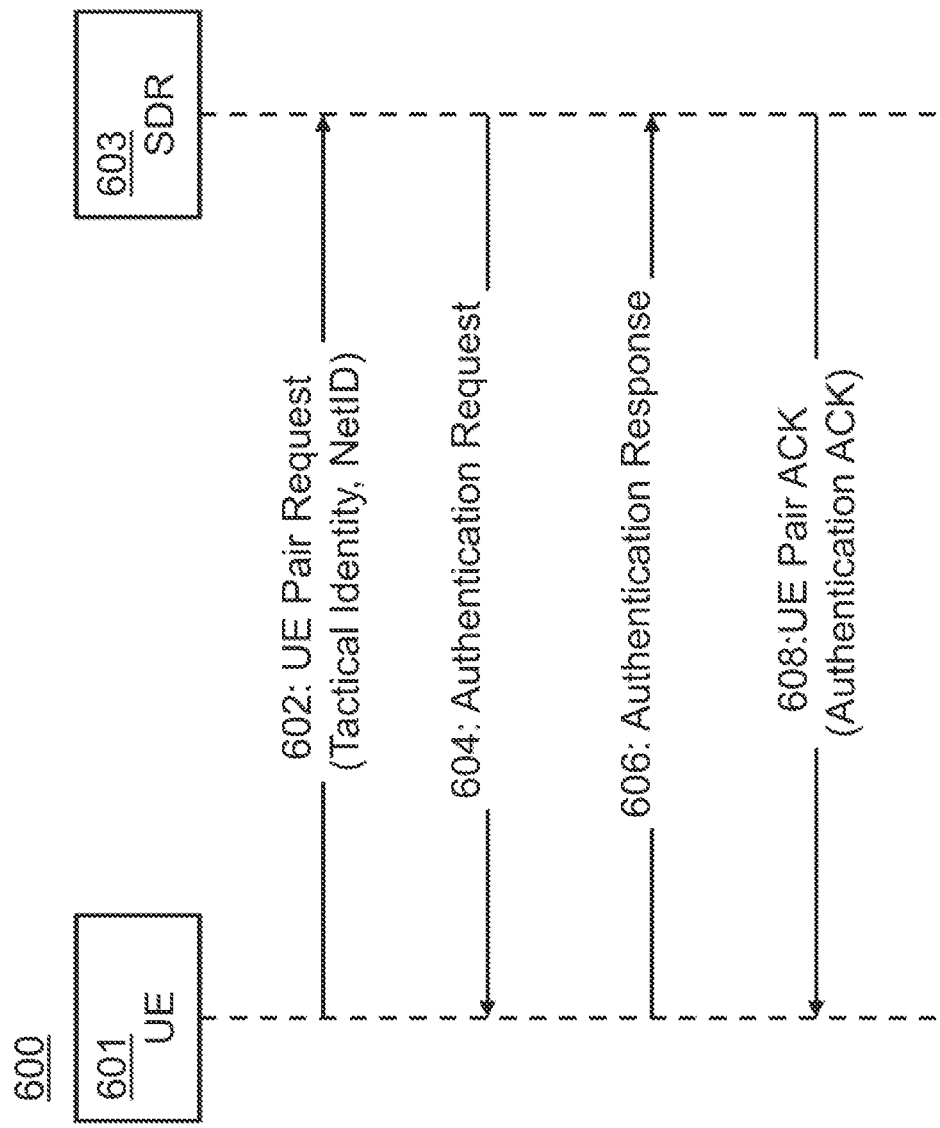
FIG. 6 depicts a sequence diagram pairing user equipment and software-defined radios, in accordance with one or more embodiments of the present disclosure.
Figure 7:
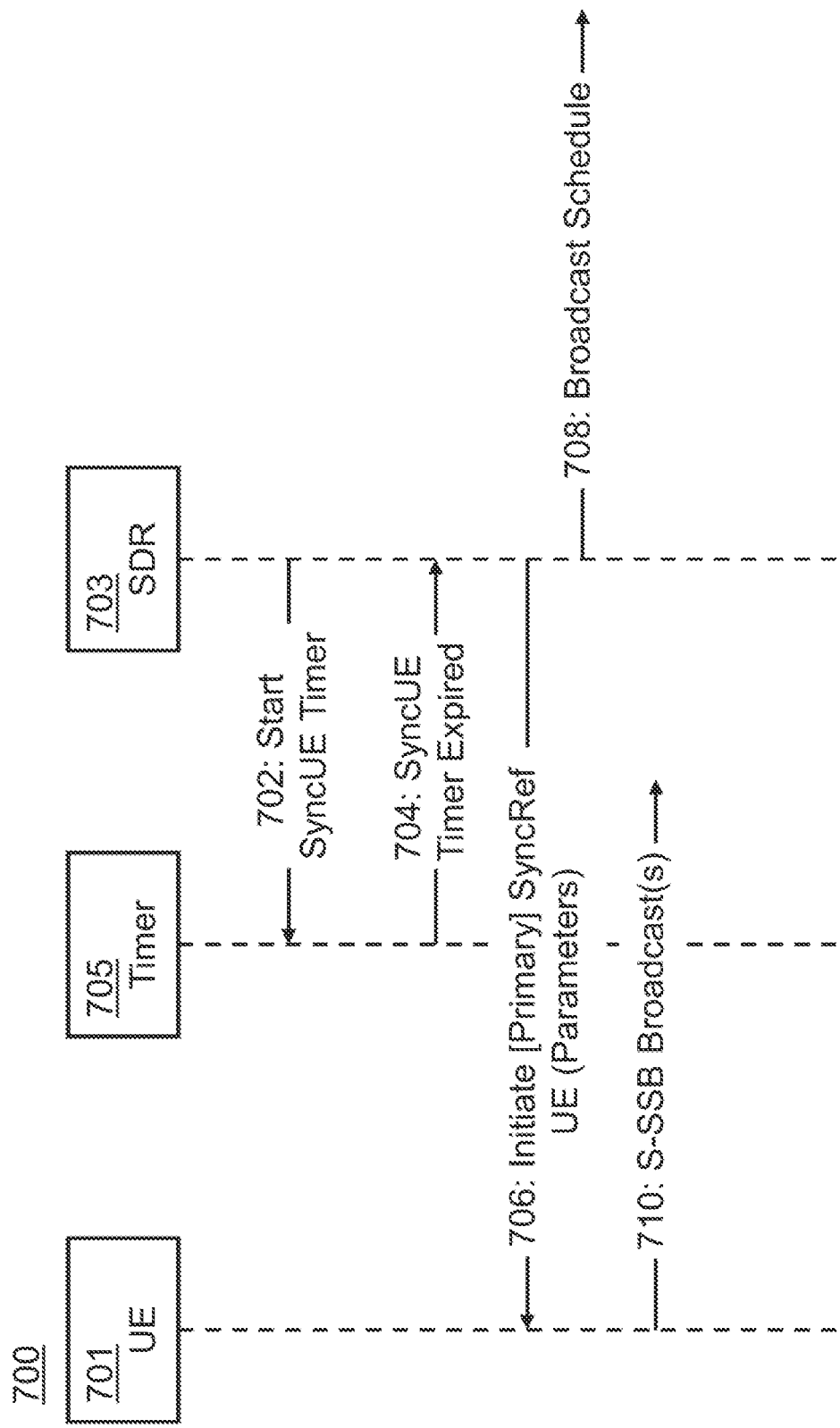
FIG. 7 depicts a sequence diagram configuring a user equipment as a Sync Reference UE for transmitting a Sidelink Synchronization Signal Block (S-SSB) according to a broadcast schedule, in accordance with one or more embodiments of the present disclosure.
Figure 8:
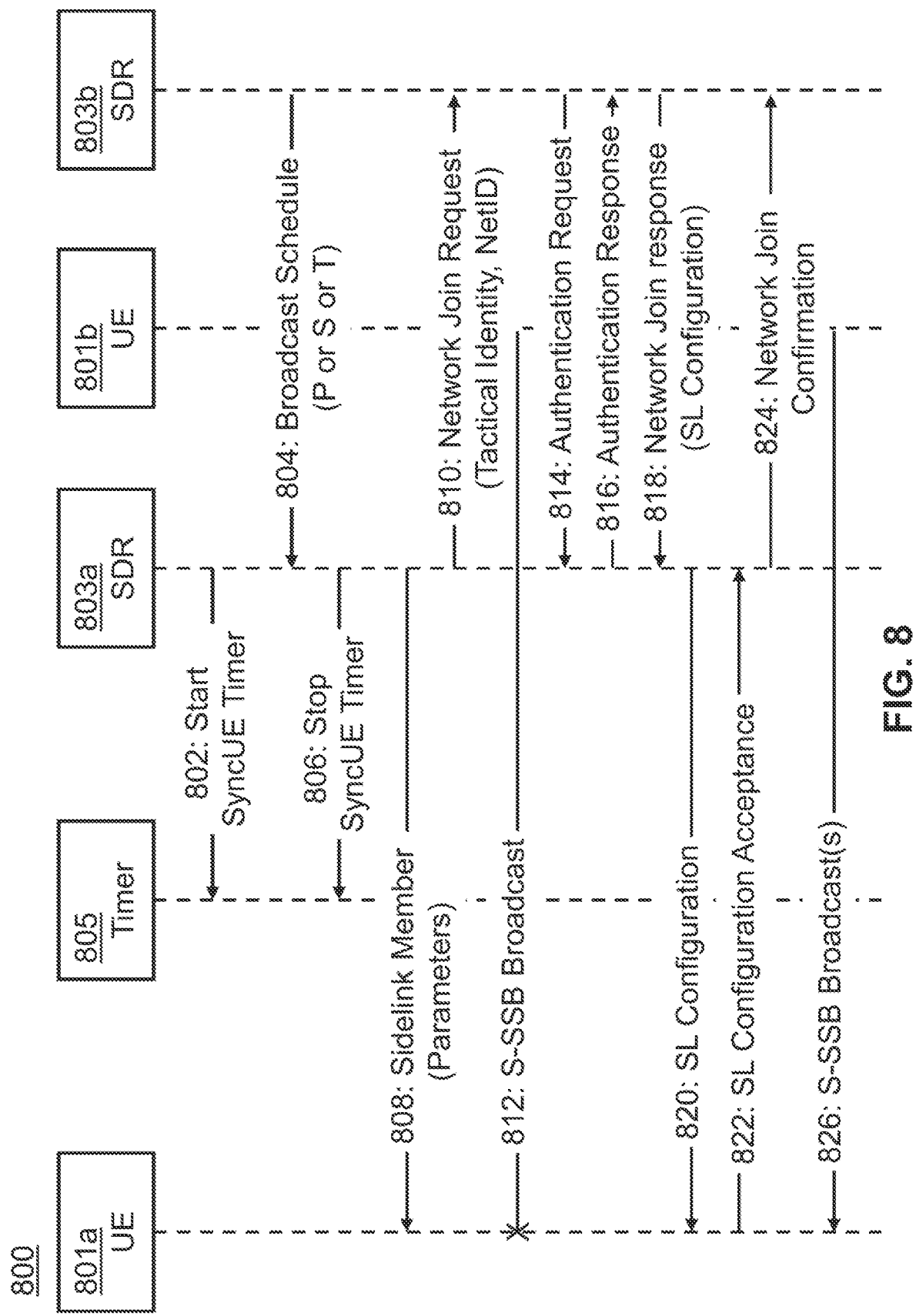
FIG. 8 depicts a sequence diagram configuring a user equipment to receive a Sidelink Synchronization Signal Block (S-SSB) according to a broadcast schedule, in accordance with one or more embodiments of the present disclosure.

Referring generally to FIGS. 6-8, one or more sequence diagrams are described. The various UEs in the sequence diagrams may refer to the UE 501. Similarly, the various SDRs in the sequence diagrams may refer to the software-defined radio 503. The various transmissions between the UE and SDR may be over the physical connection 524. The various transmissions between multiple of the SDRs may be over the sidelink 528. The various transmissions between multiple of the UEs may be over the sidelink 528. Similarly, the application 502 may be used to implement any of the various steps. As may be understood, any number of UE/SDR pairs may use the sequence diagrams depicted to pair, receive broadcast schedule, and/or synchronize with the sidelink.

In embodiments, the number of Sync Reference UEs in a sidelink network is terrain dependent. At a minimum there will be a Primary Sync Reference UE. The SDRs monitor the waveform 526 for a configurable period to ensure that the specific sidelink network is not active. If the SDR hears a S-SSB Broadcast Schedule message, then the SDR causes the UE to join the already active network. If not, the SDR causes the UE to assume the role of a Primary Sync Reference UE. The SDR then selects the appropriate transmission security (TRANSEC) key that determines when and where in the allocated resource pools the Primary/Secondary/Tertiary broadcasts will occur. This information is broadcast on the order wire network so that all users in the sidelink network knows when and where the S-SSB broadcasts will occur.

In embodiments, sidelink nodes may not hear the S-SSB broadcast or the level of the S-SSB Broadcast is below a specific threshold. Under these conditions another UE in the network can assume the role of a Secondary/Tertiary Sync Reference UE and this is broadcast over the order wire so that all nodes in the network knows the identity of the subsequent Sync Reference UE and expect the transmission over the sidelink network.

In embodiments, a keep-alive scheme may be employed to detect loss of Sync Reference UE and initiate the election of another Sync Reference UE.

Referring now to FIG. 6, a sequence diagram 600 of a method implanted by a UE 601 and a SDR 603 is described, in accordance with one or more embodiments of the present disclosure. The sequence diagram 600 may depict pairing between the UE 601 and the SDR 603.

In a step 602, the SDR 603 receives a UE Pair Request from the UE 601. The UE Pair Request may include a tactical Identity and/or a network ID. The SDR 603 may then authenticating the UE 601 based on the tactical Identity and/or a network ID.

In an optional step 604, the SDR 603 receives an Authentication Request from the UE 601. In an optional step 606, the SDR 603 transmits an Authentication Response to the UE 601. Although the UE 601 is described as authenticating the SDR 603, this is not intended as a limitation of the present disclosure. Similarly, the SDR 603 may authenticate the UE 601. Whether the UE or the SDR authenticates is not material.

In a step 608, the SDR 603 transmits a Pair Acknowledgment to the UE 601. The Pair Acknowledgment may also include an Authentication Acknowledgement.

Once paired, the SDR 603 monitors the waveform 526 for an S-SSB Broadcast Schedule message. For example, the SDR 603 may initialize a timer during which to monitor for the broadcast in response to pairing to the UE 601.

Referring now to FIG. 7, a sequence diagram 700 of a method implanted by a UE 701 and a SDR 703 is described, in accordance with one or more embodiments of the present disclosure. The sequence diagram 700 may depict formation of a Primary Sync Reference UE. The sequence diagram 700 may also be referred to as configuring the sidelink to listen for the one or more Sidelink Synchronization Signal Blocks from the UE 701.

In a step 702, a timer 705 is started. During the timer 705, the SDR 703 listens on the waveform 526 for the broadcast schedule to figure out whether/where the sync reference UE is broadcasting. In embodiments, the SDR 703 may start the timer 705 in response to pairing with the UE 701.

In a step 704, the timer 705 is expired. The SDR 703 has failed to receive the broadcast schedule during the timer. If the timer expires, the SDR 703 may determine that there is no sync reference UE within a communication range of the SDR 703 or that there is no active network within the communication range. More commonly, the timer 705 may expire when there is no active network within the communication range. This may be due to the range of the waveform 526 being relatively large when compared to the sidelink 528. For example, the SDR/UE pair may be the first to power on and/or to pair.

In a step 706, the SDR 703 may transmit a broadcast schedule to the UE 701 over the physical connection to configure the UE 701 as a sync reference UE for the sidelink network. The SDR 703 may transmit the broadcast schedule to the UE 701, including one or more transmission parameters.

In a step 708, the SDR 703 may transmit the broadcast schedule to other SDRs over the waveform 526. For example, the SDR 703 may transmit the TRANSEC key or broadcast a message stating that the next S-SSB is expected at time t using subcarrier configuration X where X refers to one of the many S-SSB configurations. The broadcast schedule may be transmitted to one or more additional software-defined radios (not depicted) causing the additional software-defined radios to configure one or more additional user equipment (not depicted) to receive the S-SSB according to the broadcast schedule.

In a step 710, the UE 701 may transmit the S-SSB 100 over the sidelink 528 according to the broadcast schedule. The UE 701 may broadcast at the appropriate places, times, and frequencies.

Referring now to FIG. 8, a sequence diagram 800 of a method implanted by one or more UEs 801 and one or more SDRs 803 is described, in accordance with one or more embodiments of the present disclosure. The sequence diagram 800 may depict a sidelink UE securely joining a sidelink network using a broadcast schedule received from a SDR physically connected to an active sync reference UE.

In a step 802, a timer 805 is started. During the timer 805, the SDR 803a listens on the waveform 526 for the broadcast schedule to figure out whether/where the sync reference UE is broadcasting.

In a step 804, the SDR 803a receives the broadcast schedule from the SDR 803b within the timer 805. The SDR 803a may then know the sidelink 528 is active and/or that the UE 801b is functioning as a sync reference UE. The message is an indication that the specified sidelink network with the specific network identifier is active. The SDR 803a may also know when the UE 801b will transmit the S-SSB 100 based on the broadcast schedule received. In embodiments, receiving the broadcast schedule includes receiving the TRANSEC key over the waveform 526. The broadcast schedule may include Primary, Secondary, or Tertiary (P or S or T) sync reference broadcast schedules.

In a step 806, the SDR 803a stops the timer 805. The timer 805 may be stopped in response to receiving the broadcast schedule.

In a step 808, the UE 801a receives a sidelink member signal from the SDR 803a over the physical connection 524. The sidelink member signal may include one or more parameters, such as a network ID. The sidelink member signal may indicate that there is a network active and details of the network. The details of the network may then be used by the UE 801a to request permission to join the network without having to become a sync reference UE.

In a step 810, the SDR 803a transmit a network join request to the SDR 803b over the waveform 526. The network join request may include a tactical identity (e.g., identity of the SDR 803a) and/or a network identity of the sidelink. The request is not sent over the 5G network. If the request is sent over the 5G network, the jammer can actually hear the request and specifically target individual UEs.

In a step 812, the UE 801a receives a S-SSB broadcast from the UE 801b over the sidelink 528. Because the UE 801b transmit at a variable time, the UE 801a may not know when to start listening for the signal. Thus, the UE 801a does not correctly receive the S-SSB.

In an optional step 814, the SDR 803a receives an authentication request from the SDR 803b over the waveform 526. In an optional step 816, the SDR 803a transmit an authentication response to the SDR 803b over the waveform 526.

In a step 818, the SDR 803a receives a network join response from the SDR 803b over the waveform 526. The network join response may include a configuration of the sidelink. The network join response may indicate that the UE 801a may join the 5G sidelink network by following a configuration. The configuration may include any suitable configuration. The configuration may indicate the subcarrier spacing. For example, the configuration may indicate the UE should operate with a subcarrier spacing of 15 kHz, 30 kHz, 60 kHz, and the like. The configuration may also indicate the number of resources allocated for the sidelink. The configuration includes the parameters needed to predict when and where the S-SSB broadcast will occur on the sidelink. The configuration parameters also tell where the contention-based resources are located.

In a step 820, the UE 801a receives the sidelink configuration from the SDR 803a over the physical connection 524. The SDR 803a may thus transmit the broadcast schedule to the user equipment over a physical connection to configure the user equipment to receive the one or more Sidelink Synchronization Signal Blocks according to the broadcast schedule.

In a step 822, the UE 801a transmits sidelink configuration acceptance message to the SDR 803a over the physical connection 524. The UE 801a is now configured to determine the location of the S-SSB broadcast based on the sidelink configuration received.

In a step 824, the SDR 803a transmit a network join confirmation to the SDR 803b over the waveform 526.

In a step 826, the UE 801a receives a S-SSB broadcast from the UE 801b over the sidelink 528. The UE 801a successfully receives the S-SSB broadcast using the slot, frequency, and time from the configuration. The UE 801a may then use the S-SSB to know the timing for communicating over the sidelink 528 after the step 826.

Referring generally to FIGS. 9A-11B, one or more methods are described. The embodiments and the enabling technology described previously herein in the context of the system 500 should be interpreted to extend to the methods. For example, various UEs and SDRs in the method may be implemented by the system 500. It is further recognized, however, that the methods are not limited to the system 500.

In embodiments, a network topology of the sidelink 528 is received over the waveform 526. The network topology may include various information, such as, but not limited to, control data, location, link connectivity, battery usage, frequencies of the sidelinks, bandwidth of the sidelinks, and the like. For example, a node may establish connection to the strongest Sync Reference UE received over the sidelink 528. Whenever a Sync Reference UE admits a node, the node assumes a 1-hop connection and the connectivity of the Sync Reference UE to all admitted nodes is periodically broadcast over the waveform 526. Thus, all nodes have the routing topology of the entire sidelink network and can establish a route to any node.

In embodiments, a routing protocol is implemented by the SDRs. The routing protocol may include transferring UE in the sidelink between sync reference UEs based on a connectivity of the UEs to the sync reference UEs. The routing protocol may also include initiating UEs in the sidelink as the sync reference UE based on connectivity to the sync reference UEs and/or a battery status. In embodiments, the SDRs may transmit the routing protocol over the waveform 526.

Connectivity to the sync reference UE may refer to a signal strength of the S-SSB transmitted by the sync reference UE which is received by UEs in the sidelink. For example, the UEs may include connectivity to multiple sync reference UEs in the sidelink. A network manager may allocate the UEs to the sync reference UEs based on the signal strength. For example, the SDRs may function as the network manager for the sidelink, although this is not intended to be limiting. In embodiments, nodes may lose connectivity with the Sync Reference UE or may have access to a better Sync Reference UE. Under this condition, the node can request transfer from one Sync Reference UE to a better Sync Reference UE.

A node may become a Sync Reference UE because the node is unable to hear other Sync Reference UEs in the network. Whenever a new UE becomes a Sync Reference UE, an optimization process is undertaken to determine the minimal number of Sync Reference UEs that can connect the entire network while being able to hear each other. The optimization process is advantageous to find a route from any node to any other node in the sidelink network without burdening all nodes in the network.

In embodiments, UE and/or SDRs are configured to implement Sidelink Resource Allocation. A distributed sidelink resource allocation scheme similar to one that was used in FlexNet, Joint Combat Waveform (JCW), or Joint Networking Waveform (JNW) will be employed by the sidelink. The resource management protocol may allow the UE to may reserve a number of slots. The number of slots may be reserved based on the amount of information to be transmitted. If no other nodes objects to the reservation, the UE may be allowed to transmit in the slots. If a node objects to the reservation, the UE is unable to transmit in the slots. The resource management protocol may be sent over the waveform 526.

In embodiments, UE and/or SDRs are configured to implement Sidelink Network Battery Management. The number of Sync Reference UE required to ensure that all UE's in the squad is equivalent to the number of relays needed to ensure that multicast and broadcast traffic can be delivered to all users. Because the Sync Reference UE has to perform traffic relaying in addition to acting as a Sync Reference UE, its battery will deplete faster than other users. The battery status of the UEs including the sync reference UE in the 5G network and the SDRs in the tactical network may be recorded and periodically exchanged over the waveform. New Sync Reference UEs will be selected to ensure that full network coverage is available as well as battery deployment is nearly uniform across the network. For example, the sync reference UE and the relay UEs may be changed when the battery of the sync reference UE and/or the relay UE falls below a threshold. The optimization scheme will ensure that all users will drain their battery uniformly to maximize mission performance. The battery management may be on a per sidelink network.

In embodiments, a network manager may determine that information is important and transmit that information at a higher data rate. Transmitting the information at the higher data rate may increase the battery drain of the nodes.

In embodiments, UE and/or SDRs are configured to implement Sidelink Network Management. In embodiments, Sidelink Network Management applications may be deployed at Platoon and Company Levels. The Sidelink Network Management applications may allow the sidelink 528 to reduce battery power consumption and maximize mission duration. The squad commander periodically reports his location, sidelink frequency and bandwidth to the platoon commander. The Platoon commander's sidelink management application shows this information on his display.

In embodiments, sidelink frequency reuse is managed. Sidelink frequency reuse may be managed because only a limited number of sidelink networks can be deployed in a region. Sidelink in stand-alone mode allocate only 65 megahertz of bandwidth. The minimum bandwidth that can be used in just 10 megahertz per channel, for a total of up to six channels. Similarly, a 5G network is permitted in each of the six channels without interference. In this regard, six 5G network are permitted without reusing a channel. When 7 or more networks are used, one of the networks has to reuse the frequencies of the bandwidth. If a sidelink reusing the same frequency approaches another sidelink, then frequency deconfliction is performed and a non-interfering frequency is allocated by pushing a new configuration for that squad over the order wire. If frequency deconfliction is not possible, then a network merge is performed by pushing a new configuration to one of the sidelinks such that both sidelinks have the same network identifier. This forces the sidelink network to determine if there is an already existing network and will join the new network. A similar process is done for a network split i.e., when nodes in the sidelink breaks up to go in different directions.

In embodiments, network management is performed over the waveform 526. The frequencies, the resource allocations, the number of subcarriers, and the like of the side link network may be reconfigured by communicating the information over the waveform 526. A network manager may communicate the information to the nodes in the network. For example, the sidelink may be a squad of soldiers and the network manager may be a platoon leader. By way of another example, a company commander may reorganize the resources of the platoons. In response to the reorganization by the company commander, the platoons may then reorganize the resources of the squads. The waveform 526 may allow company commander and the platoon commanders to reach any member of a squad directly or indirectly. The commanders may continuously evaluate the sidelink network performance and reconfigure the network on the fly via the order wire for interference mitigation as well as enemy denial.

In embodiments, inter-sidelink communication and/or hierarchical communication with the platoon leader and company commander is communicated over the waveform 526.

If one or more sidelink nodes are airborne, then communication range to the airborne node is nearly double that of ground-to-ground sidelink communication. If an airborne node has visibility to another sidelink squad, then the platoon commander can choose to merge both networks into one and elect the airborne node as a Sync Reference UE so that information can flow across the two squads. In this case, traffic between the two nodes need not go over the order wire network. This is an opportunistic form of communication as the enemy jammer can easily target the airborne node and break the connectivity.

A communication system may include a hierarchy with a company commander, one or more platoons under the company commander, and one or more squads under one or more platoons. The squads may include one or more nodes (e.g., soldiers). Each soldier may include a UE/SDR pair. The company commander may control the platoons. The platoon leader may then control the squads. The company commander may also be able to reach individual squads. For example, the company commander may communicate with the squads if the platoon leader is incapacitated. Both the company and the platoon will typically be not operating the 5G. The company may not operate the 5G because the distance between the company and the platoon may be beyond the 5G propagation range. Similarly, the platoon may not operate the 5G because the distance between the platoon and the squad may be beyond the propagation range. Instead, the company and the platoon will typically communicate information over the waveform 526. The company and platoon may also communicate information by utilizing a store and forward technique.

During initiation, the network manager (e.g., squad, platoon, and/or commander) may determine that the networks which are using the same channels are beyond the propagation of the 5G sidelink, such that the two networks do not interfere. The networks may come closer over time because the nodes in the networks may be mobile. When the networks come within the 5G propagation range, the networks may interfere with one another. An inter-sidelink routing mechanism may be used to determine where the networks are located (e.g., if the nodes are coming within the 5G propagation range. The inter-sidelink routing mechanism may then cause the networks to change channels when the networks are within the 5G propagation range. The channels may be changed to an open channel or a channel in which other 5G networks are sufficiently far away to avoid interference. A new sidelink network configuration for the sidelink may be sent over the waveform 526 to the SDRs. The new sidelink network configuration may include a new channel number. The SDR of the SDR/UE pair in the network may receive the channel number from the tactical network. The SDR may then reconfigure the UE to communicate on the new channel number.

For example, a platoon sidelink or a company sidelink may include a network manager. The network manager may determine the sidelink squad and the sidelink squad are using a Channel 1. The network manager may also determine a location of the sidelink squad and the sidelink squad based on control data. The network manager may determine the sidelink squads are coming to close together such that there is likely to be interference. The network manager may also determine the sidelink squad is able to communicate over Channel 2 without interfering with any sidelink squads within the 5G propagation range. The network manager may broadcast a message to the SDRs of the sidelink squad 1. The message may cause the SDRs in the sidelink squad to reconfigure the UEs to communicate in a Channel 2. The UEs may then form a sidelink over the Channel 2.

An application may be implemented at the squad level, the platoon level, and/or the company level to manage the channels. The information flows across the entire network. The company level can see the throughput for the squads. The company level may also see that the squads may request more than one channel. The network manager may then be used to reconfigure the channels by the waveform 526. The application at the platoon level will manage the resources of the squads connected to the platoon by the waveform 526. The company may manage the resources of the platoons. The platoons may then ensure the squads ensure the requirements specified by the company.

Figure 9B:
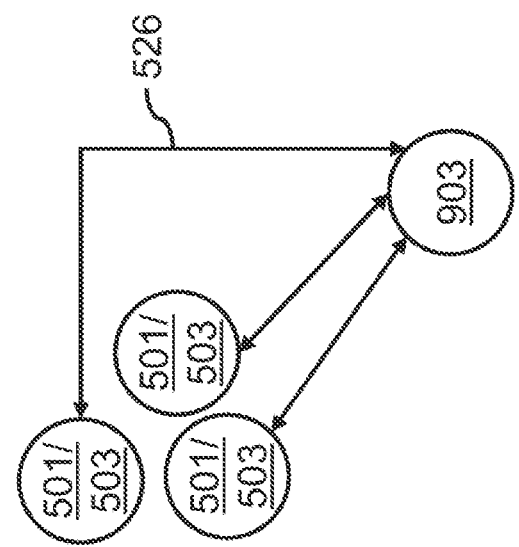
FIGS. 9B-9C depicts a simplified block diagram of a network manager determining a Sync Reference user equipment according to a routing protocol, in accordance with one or more embodiments of the present disclosure.
Figure 9C:
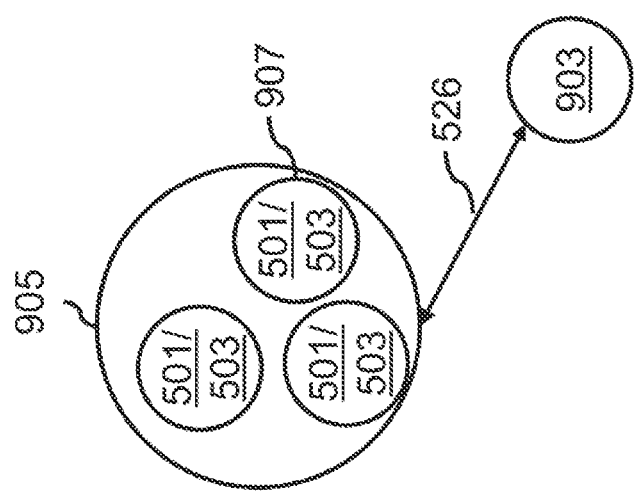

Referring now to FIG. 9A, a flow diagram of a method 900 is described, in accordance with one or more embodiments of the present disclosure. The method 900 may be further understood by reference to FIGS. 9B-9C which depicts a system 901 including a network manager 903 managing UE 501 and SDR 503 pairs. The method 900 may be used by platoon leaders to manage the sidelink networks of the squads under control of the platoon leaders.

In a step 902, control data sent over the waveform 526 is collected.

In a step 904, location and link connectivity status of network members are extracted. The location and link connectivity status may be extracted from the control data. The network member(s) may refer to the UEs 501 in the sidelink network.

In a step 906, a link connectivity between the network members is determined. The link connectivity between the network members may be determined based on the location and link connectivity status.

In a step 908, a sync reference UE is determined. The sync reference UE may be determined based on the link connectivity between the network members. For example, one of more sync reference UE may be determined to ensure the network members may receive S-SSB broadcasts from at least one sync reference UE.

Figure 10B:
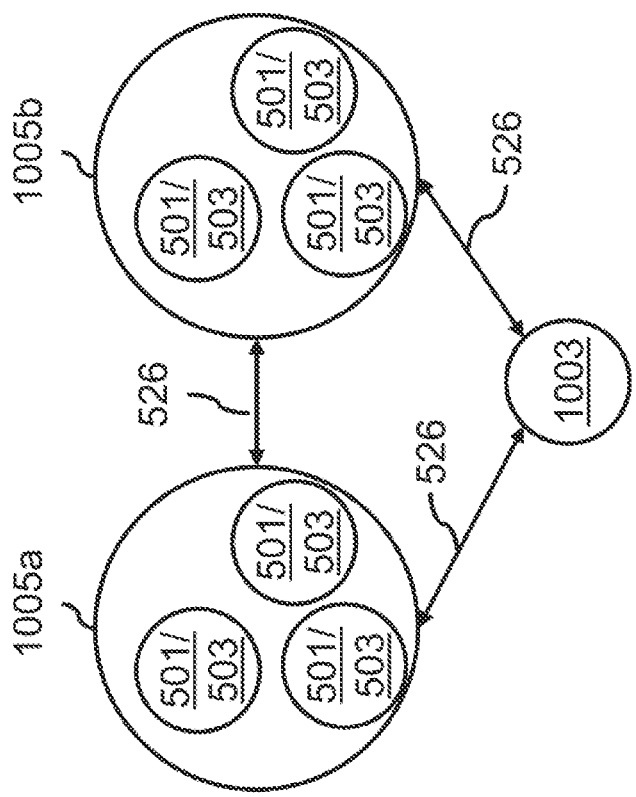
FIGS. 10B-10D depicts a simplified block diagram of a network manager configuring sidelink networks to avoid interference, in accordance with one or more embodiments of the present disclosure.

Referring now to FIG. 10A, a flow diagram of a method 1000 is described, in accordance with one or more embodiments of the present disclosure. The method 1000 may be further understood by reference to FIGS. 10B-10C which depicts a system 1001 including a network manager 1003 managing sidelink networks 1005 of UE 501 and SDR 503 pairs. The method 1000 may be used by platoon leaders to manage the sidelink networks of the squads under control of the platoon leaders.

In a step 1002, control data sent over the waveform 526 is collected.

Figure 10C:
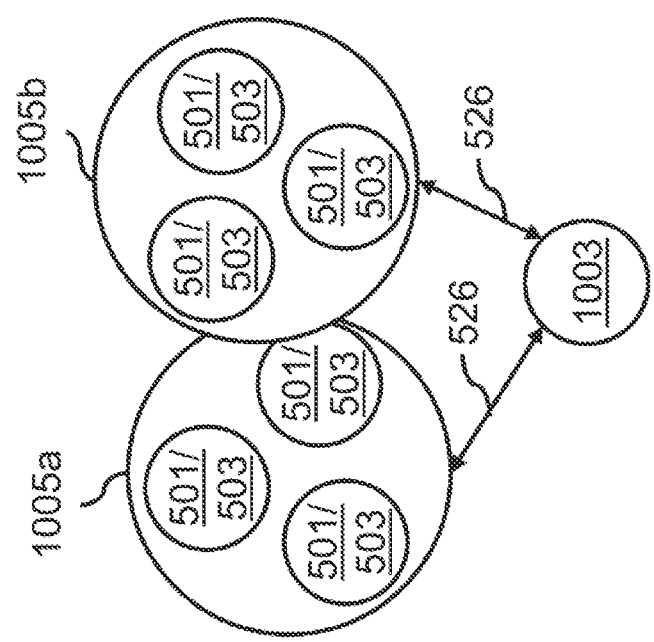
Figure 10D:
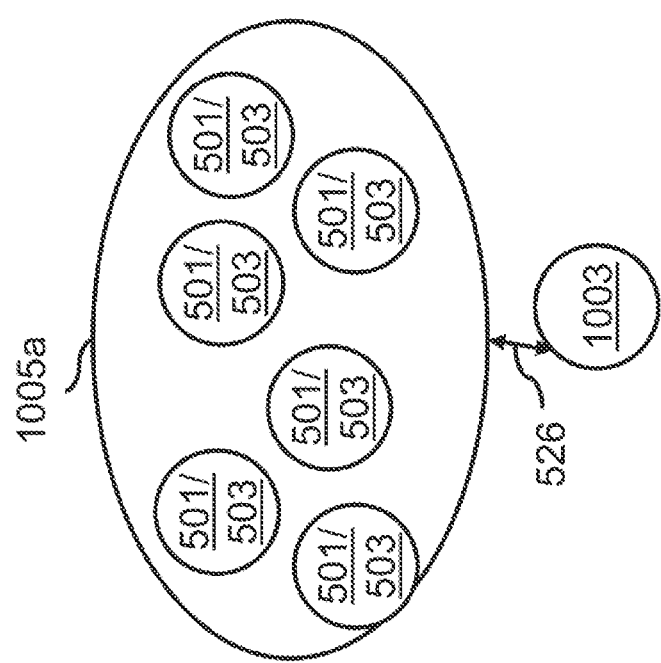

In a step 1004, location and link connectivity status of network members are extracted. The location and link connectivity status may be extracted from the control data. The network member(s) may refer to the UEs 501 in the sidelink network In a step 1006, interference with adjacent network is predicted. The interference may be predicted based on the location and link connectivity status. For example, FIG. 10B depicts the sidelink network 1005a which does not interfere with the sidelink network 1005b. By way of another example, FIG. 10C depicts the sidelink network 1005a interfering with the sidelink network 1005b.

In a step 1008, sidelink frequency reuse is computed.

In a step 1010, a new sidelink network configuration is determined. The new sidelink network configuration may minimize the interference between the adjacent networks. The new sidelink network configuration may include merging the sidelink networks by changing one of the network identifiers to match with the adjacent sidelink network.

In a step 1012, the new sidelink network configuration is deployed. The new sidelink network configuration may be deployed by communicating the network identifier from the network manager 1003 to the SDRs 503 over the waveform 526. The SDRs 503 may then communicate the network identifier to the UEs 501 for reconfiguring the UEs to the new configuration.

Figure 11A:
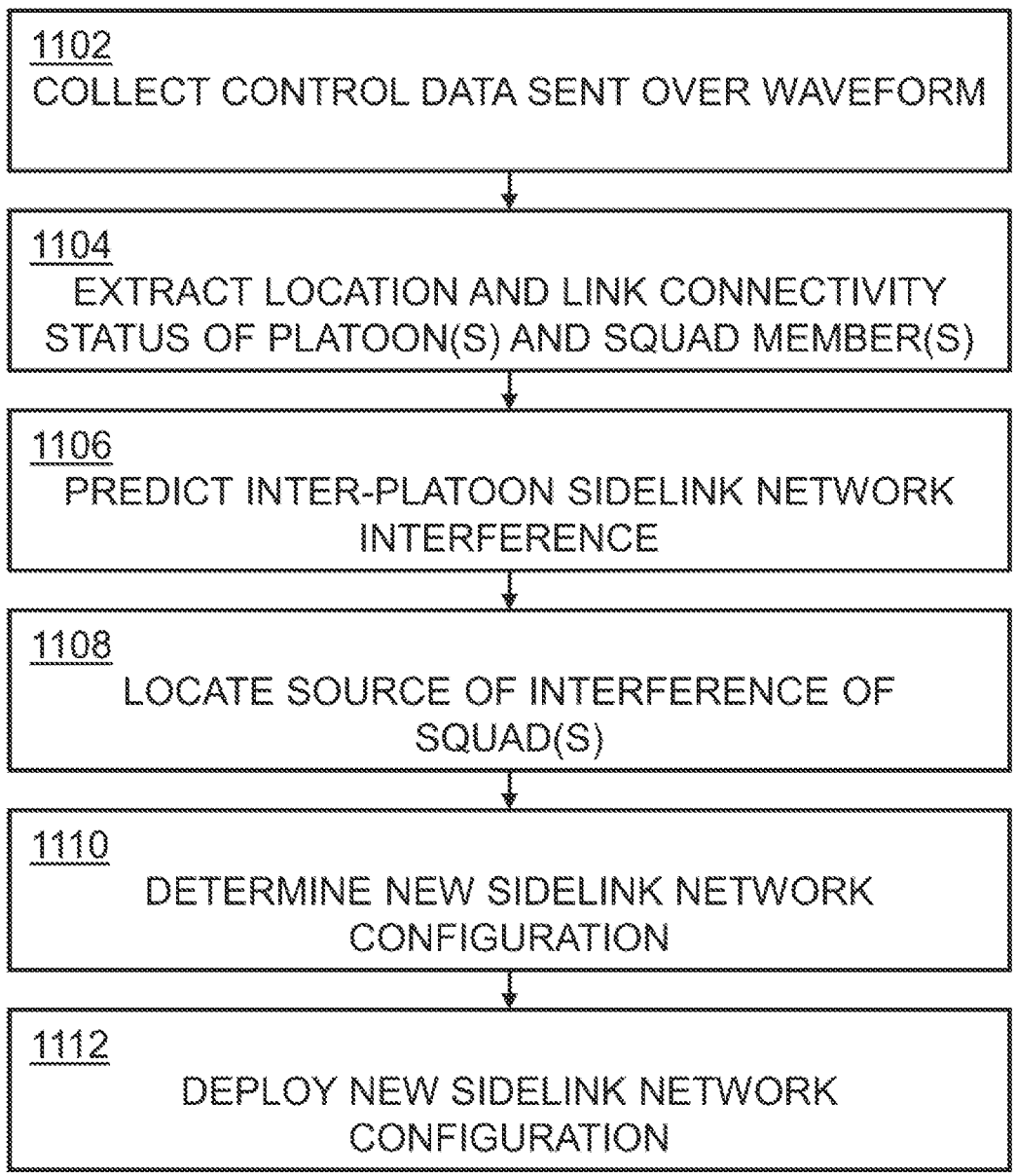
FIG. 11A depicts a flow diagram of a method for configuring sidelink networks to avoid inter-platoon interference, in accordance with one or more embodiments of the present disclosure.

Referring now to FIG. 11A, a flow diagram of a method 1100 is described, in accordance with one or more embodiments of the present disclosure. The method 1100 may be further understood by reference to FIG. 11B which depicts a system 1101 including network managers 1103 managing sidelink networks 1105 of UE 501 and SDR 503 pairs and network manager 1109 managing the network managers 1003. The network manager 1103 may also be referred to as platoon leaders. The network manager 1109 may also be referred to as company commanders. In embodiments, the method 1100 may be used to coordinate the activities of all sidelink networks in a company.

In a step 1102, control data sent over the waveform 526 is collected

In a step 1104, location and link connectivity status of platoons and squad members is extracted. The location and link connectivity status may be extracted from the control data.

In a step 1106, inter-platoon sidelink network interference is predicted. The inter-platoon sidelink network interference may be predicted from the location and link connectivity status of platoons and squad members.

Figure 11B:
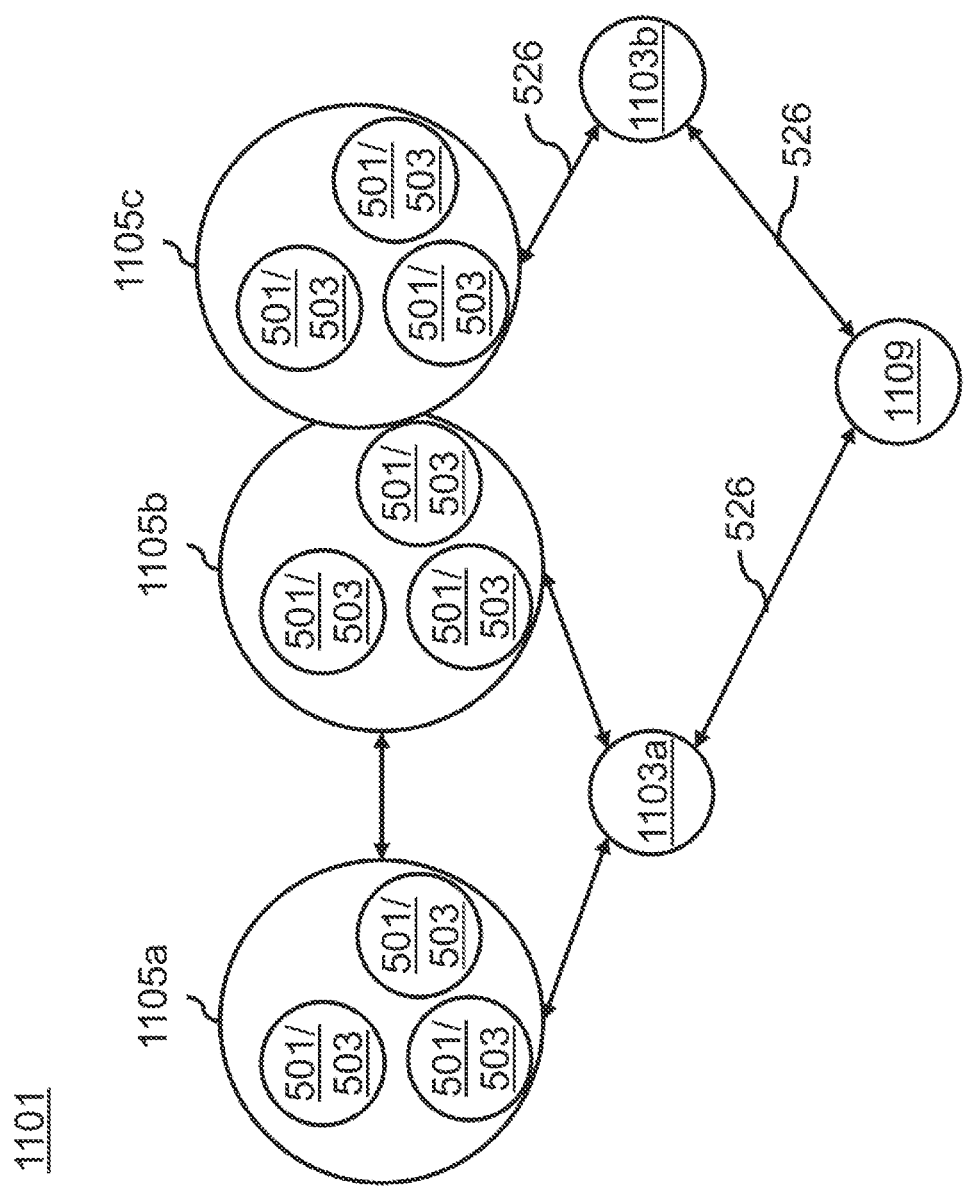
FIG. 11B depicts a simplified block diagram of a network manager configuring sidelink networks to avoid inter-pla-

In a step 1108, a source of interference of squad(s) is located. For example, FIG. 11B depicts interference between the sidelink network 1105b managed by the network manager 1103a and the sidelink network 1105c managed by the network manager 1103b.

In a step 1110, a new sidelink network configuration is determined. The new sidelink network configuration may be determined to reduce the interference between the sidelink networks 1105. For example, the network manager 1109 may determine a new network identifier for the sidelink network 1105c which does not interfere with the sidelink network 1105b.

In a step 1112, the new sidelink network configuration may be deployed. For example, the new sidelink network configuration may be deployed by communicating the network identifier from the network manager 1109 to network manager 1103b over the waveform 526. The network manager 1103b may then communicate the new sidelink network configuration over the waveform 526 to the SDRs 503 in the sidelink network 1105c. The SDRs 503 may then communicate the network identifier to the UEs 501 for reconfiguring the UEs to the new configuration.

Referring generally again to FIGS. 1-11B. The methods, operations, and/or functionality disclosed may be implemented as sets of instructions or software readable by a device. Further, it is understood that the specific order or hierarchy of steps in the methods, operations, and/or functionality disclosed are examples of exemplary approaches. Based upon design preferences, it is understood that the specific order or hierarchy of steps in the methods, operations, and/or functionality can be rearranged while remaining within the scope of the inventive concepts disclosed herein. The accompanying claims may present elements of the various steps in a sample order, and are not necessarily meant to be limited to the specific order or hierarchy presented. It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although much of the present disclosure is directed to 5G new radio (5G NR), this is not intended as a limitation of the present disclosure. Sidelink communication may also be supported over a Long-Term Evolution (LTE) wireless broadband communication standard. Thus, the concepts of the present disclosure also apply to LTE with appropriate changes from the 5G NR to LTE. Similarly, the concepts of the present disclosure also apply to 6G that is in development. In this regard, 6G third-generation partnership project (3GPP) sidelinks may be formed after receiving sync schedules from the radios.

One or more of the UE or the radios may include memory and processor(s). The processor may include any processing unit known in the art. For example, the processor may include a multi-core processor, a single-core processor, a reconfigurable logic device (e.g., FPGAs), a digital signal processor (DSP), a special purpose logic device (e.g., ASICs)), or other integrated formats. Those skilled in the art will recognize that aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software/and or firmware would be well within the skill of one skilled in the art in light of this disclosure. Such hardware, software, and/or firmware implementation may be a design choice based on various cost, efficiency, or other metrics. In this sense, the processor(s) may include any microprocessor-type device configured to execute software algorithms and/or instructions. In general, the term "processor" may be broadly defined to encompass any device having one or more processing elements, which execute program instructions from memory, from firmware, or by hardware implemented functions. It should be recognized that the steps described throughout the present disclosure may be carried out by the processors.

A memory may include any storage medium known in the art. For example, the storage medium may include a non-transitory memory medium. For instance, the non-transitory memory medium may include, but is not limited to, a read-only memory (ROM), a random-access memory (RAM), a magnetic or optical memory device (e.g., disk), a solid-state drive and the like. It is further noted that memory may be housed in a common controller housing with the one or more processor(s). For example, the memory and the processor may be housed in a processing unit, a desktop computer, or the like. In an alternative embodiment, the memory may be located remotely with respect to the physical location of the processor. In another embodiment, the memory maintains program instructions for causing the processor(s) to carry out the various steps described through the present disclosure. For example, the program instructions may include one or more of TAPP functions as described herein.

As depicted, the system 500 does not include a base station, although this is not intended to be a limitation of the present disclosure. For example, the UE 501 may connect to the base station. However, the UE 501 may commonly form the sidelink network in instances where the base station is not available in accordance with one or more modes of V2X.

Although the system 500 is described as including a UE 501 for communicating by the cellular waveform and the software-defined radio for communicating by the waveform 526, this is not intended as a limitation of the present disclosure. In embodiments, a radio may also include a 2-channel radio with a combined UE/tactical sidelink application. These two channels could employ the functionality of the UE 501 and the software-defined radio From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed:

1. A software-defined radio comprising:
a memory maintaining program instructions; and
one or more processors configured to execute the program instructions causing the one or more processors to:
configure a user equipment to join a sidelink by:
receiving a first broadcast schedule of one or more Sidelink Synchronization Signal Blocks over a waveform; and
transmitting the first broadcast schedule to the user equipment over a physical connection to configure the user equipment to receive the one or more Sidelink Synchronization Signal Blocks according to the first broadcast schedule; and
configure the sidelink to listen for the one or more Sidelink Synchronization Signal Blocks from the user equipment by:
initiating a timer;
failing to receive the first broadcast schedule during the timer;
transmitting a second broadcast schedule to the user equipment over the physical connection to configure the user equipment as a sync reference user equipment; and
transmitting the second broadcast schedule over the waveform to one or more additional software-defined radios causing the additional software-defined radios to configure one or more additional user equipment to receive the Sidelink Synchronization Signal Blocks according to the second broadcast schedule;
wherein the one or more Sidelink Synchronization Signal Blocks include a Sidelink Synchronization Signal; wherein the one or more Sidelink Synchronization Signal Blocks occupy a plurality of subcarriers; wherein the first broadcast schedule and the second broadcast schedule each cause a location of the plurality of subcarriers to hop for avoiding active jamming of the Sidelink Synchronization Signal.

2. The software-defined radio of claim 1, wherein the program instructions cause the one or more processors to pair to the user equipment; wherein the timer is initiated in response to pairing to the user equipment.

3. The software-defined radio of claim 2, wherein authenticating the user equipment comprises receiving a pairing request from the user equipment, authenticating the user equipment, and transmitting an acknowledgement to the user equipment.

4. The software-defined radio of claim 1, wherein the program instructions cause the one or more processors to determine the first broadcast schedule and the second broadcast schedule pseudo-randomly by a transmission security key and algorithm; wherein transmitting the second broadcast schedule over the waveform comprises transmitting the transmission security key over the waveform.

5. The software-defined radio of claim 1, wherein the first broadcast schedule and the second broadcast schedule each cause the plurality of subcarriers to be contiguous.

6. The software-defined radio of claim 1, wherein the program instructions cause the one or more processors to receive a network topology of the sidelink over the waveform, implement a routing protocol for the sidelink, and transmit the routing protocol over the waveform.

7. The software-defined radio of claim 6, wherein the routing protocol comprises transferring one or more user equipment in the sidelink between one or more of a plurality of sync reference user equipment based on a connectivity of the one or more user equipment to the plurality of sync reference user equipment.

8. The software-defined radio of claim 6, wherein the routing protocol comprises initiating one or more user equipment in the sidelink as the sync reference user equipment based on at least one of a connectivity of the one or more user equipment to a plurality of sync reference user equipment or a battery status of the one or more user equipment.

9. The software-defined radio of claim 1, wherein the program instructions cause the one or more processors to function as a network manager for the sidelink.

10. The software-defined radio of claim 1, wherein the sidelink is a 5G sidelink in one of a 5G Frequency Range 1 (FR1) or a 5G Frequency Range 2 (FR2).

11. The software-defined radio of claim 1, wherein the waveform is selected from the Department of Defense Communications Waveform Inventory.

12. The software-defined radio of claim 1, further comprising an interface configured to connect to the user equipment by the physical connection.

13. The software-defined radio of claim 12, wherein the physical connection is a universal serial bus.

14. The software-defined radio of claim 1, wherein the one or more Sidelink Synchronization Signal Blocks includes the Sidelink Synchronization Signal and one or more Physical Sidelink Broadcast Channels; wherein the Sidelink Synchronization Signal includes one or more Sidelink Primary Synchronization Channels and one or more Sidelink Secondary Synchronization Channels.

15. A system comprising:
a plurality of software-defined radios; wherein the plurality of software-defined radios each comprise a memory maintaining program instructions and one or more processors configured to execute the program instructions causing the one or more processors to:
configure a user equipment to join a sidelink by:
receiving a first broadcast schedule of one or more Sidelink Synchronization Signal Blocks over a waveform; and
transmitting the first broadcast schedule to the user equipment over a physical connection to configure the user equipment to receive the one or more Sidelink Synchronization Signal Blocks according to the first broadcast schedule; and
configure the sidelink to listen for the one or more Sidelink Synchronization Signal Blocks from the user equipment by:
initiating a timer;
failing to receive the first broadcast schedule during the timer;
transmitting a second broadcast schedule to the user equipment over the physical connection to configure the user equipment as a sync reference user equipment; and
transmitting the second broadcast schedule over the waveform to the plurality of software-defined radios causing the plurality of software-defined radios to configure one or more additional user equipment in the sidelink to receive the Sidelink Synchronization Signal Blocks according to the second broadcast schedule;
wherein the one or more Sidelink Synchronization Signal Blocks include a Sidelink Synchronization Signal; wherein the one or more Sidelink Synchronization Signal Blocks occupies occupy a plurality of subcarriers; wherein the first broadcast schedule and the second broadcast schedule each cause a location of the plurality of subcarriers to hop for avoiding active jamming of the Sidelink Synchronization Signal.

16. The system of claim 15, further comprising a network manager; wherein the network manager is configured to execute program instructions causing the network manager to:
   receive information from the plurality of software-defined radios over the waveform, wherein the information includes a location of the user equipment, a frequency of the sidelink, and a bandwidth of the sidelink; and
   detect the sidelink interferes with a second sidelink.

17. The system of claim 16, wherein the program instructions cause the network manager to transmit a new sidelink network configuration for the sidelink to the plurality of software-defined radios over the waveform in response to detecting that the sidelink interferes with the second sidelink.

18. The system of claim 16, wherein the program instructions cause the network manager to transmit a command to merge the sidelink with the second sidelink to the plurality of software-defined radios by updating a network identifier of the sidelink.

19. The system of claim 15, further comprising a network manager configured to execute program instructions causing the network manager to:
   receive information from the plurality of software-defined radios over the waveform, wherein the information includes a location and a link connectivity status of the user equipment;
   select the user equipment as the sync reference user equipment based on the location and the link connectivity status; and
   transmit a signal to a first software-defined radio of the plurality of software-defined radios, wherein the signal causes the first software-defined radio to configure the user equipment as the sync reference user equipment.

20. The system of claim 15, wherein the sync reference user equipment transmits the Sidelink Synchronization Signal Blocks according to the second broadcast schedule; wherein the user equipment is configured to receive the Sidelink Synchronization Signal Blocks according to the second broadcast schedule.

\* \* \* \* \*